US010870583B2

(12) United States Patent
McGuire et al.

(10) Patent No.: US 10,870,583 B2
(45) Date of Patent: Dec. 22, 2020

(54) PROCESS FOR THE PRODUCTION OF A ZEOLITIC MATERIAL VIA SOLVENT-FREE INTERZEOLITIC CONVERSION

(71) Applicant: BASF SE, Ludwigshafen am Rhein (DE)

(72) Inventors: Robert McGuire, Florham Park, NJ (US); Mathias Feyen, Ludwigshafen (DE); Ulrich Mueller, Ludwigshafen (DE); Xinhe Bao, Dalian (CN); Weiping Zhang, Dalian (CN); Dirk De Vos, Leuven (BE); Hermann Gies, Bochum (DE); Feng-Shou Xiao, Hangzhou (CN); Toshiyuki Yokoi, Yokohama (JP); Ute Kolb, Mainz (DE); Bernd Marler, Bochum (DE); Chuan Shi, Dalian (CN); Xiulian Pan, Dalian (CN); Xiangju Meng, Hangzhou (CN); Stefan Maurer, Shanghai (CN); Yu Dai, Shanghai (CN); Yong Wang, Yokohama (JP); Trees De Baerdemaeker, Leuven (BE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/463,263

(22) PCT Filed: Dec. 13, 2017

(86) PCT No.: PCT/CN2017/115938
§ 371 (c)(1),
(2) Date: May 22, 2019

(87) PCT Pub. No.: WO2018/113566
PCT Pub. Date: Jun. 28, 2018

(65) Prior Publication Data
US 2019/0300375 A1      Oct. 3, 2019

(30) Foreign Application Priority Data

Dec. 21, 2016   (WO) ................ PCT/CN2016/111314

(51) Int. Cl.
*C01B 39/48* (2006.01)
*B01J 29/70* (2006.01)
(Continued)

(52) U.S. Cl.
CPC .......... *C01B 39/48* (2013.01); *B01D 53/9418* (2013.01); *B01J 29/06* (2013.01);
(Continued)

(58) Field of Classification Search
CPC .... C01B 39/026; C01B 39/48; B01J 29/7015; B01J 29/783; B01J 29/70; B01J 29/763; B01D 53/9418; B01D 2255/50
See application file for complete search history.

(56) References Cited

U.S. PATENT DOCUMENTS 4,544,538 A    10/1985 Zones
4,665,110 A    5/1987 Zones
(Continued)

FOREIGN PATENT DOCUMENTS

CN    104520235 A    4/2015
CN    105314648 A    2/2016
(Continued)

OTHER PUBLICATIONS

Zones et al, "A Study of Piperidinium Structure-Directing Agents in the Synthesis of Silica Molecular Sieves under Fluoride-Based Conditions", JACS 2007, 129, 29, 9066-9079 (Year: 2007).*
(Continued)

*Primary Examiner* — David M Brunsman
(74) *Attorney, Agent, or Firm* — Oblon, McClelland, Maier & Neustadt, L.L.P.

(57) ABSTRACT

A process for preparing a zeolitic material containing $YO_2$ and $X_2O_3$, where Y and X represent a tetravalent element
(Continued)

and a trivalent element, respectively, is described. The process includes (1) a step of preparing a mixture containing one or more structure directing agents, seed crystals, and a first zeolitic material containing $YO_2$ and $X_2O_3$ and having FAU-, GIS-, MOR-, and/or LTA-type framework structures; and (2) a step of heating the mixture for obtaining a second zeolitic material containing $YO_2$ and $X_2O_3$ and having a different framework structure than the first zeolitic material. The mixture prepared in (1) and heated in (2) contains 1000 wt % or less of $H_2O$ based on 100 wt % of $YO_2$ in the framework structure of the first zeolitic material. A zeolitic material obtainable and/or obtained by the process and its use are also described.

15 Claims, 9 Drawing Sheets

(51) Int. Cl.
| | |
|---|---|
| B01D 53/94 | (2006.01) |
| B01J 29/76 | (2006.01) |
| B01J 35/10 | (2006.01) |
| B01J 37/08 | (2006.01) |
| B01J 37/30 | (2006.01) |
| B01J 29/06 | (2006.01) |
| B01J 35/00 | (2006.01) |
| C01B 39/02 | (2006.01) |

(52) U.S. Cl.
CPC ........... *B01J 29/70* (2013.01); *B01J 29/7015* (2013.01); *B01J 29/763* (2013.01); *B01J 35/002* (2013.01); *B01J 35/1023* (2013.01); *B01J 35/1038* (2013.01); *B01J 35/1057* (2013.01); *B01J 35/1061* (2013.01); *B01J 35/1066* (2013.01); *B01J 37/08* (2013.01); *B01J 37/30* (2013.01); *C01B 39/026* (2013.01); *B01D 53/9427* (2013.01); *B01D 53/9436* (2013.01); *B01D 2253/1085* (2013.01); *B01D 2253/306* (2013.01); *B01D 2253/311* (2013.01); *B01D 2255/50* (2013.01); *B01D 2255/9205* (2013.01); *B01D 2255/9207* (2013.01); *B01D 2257/402* (2013.01); *B01D 2257/404* (2013.01); *B01D 2257/406* (2013.01); *B01D 2257/504* (2013.01); *B01D 2258/012* (2013.01); *B01J 2229/186* (2013.01); *C01P 2002/72* (2013.01); *C01P 2002/86* (2013.01)

(56) References Cited

U.S. PATENT DOCUMENTS

| | | | |
|---|---|---|---|
| 9,708,192 | B2 | 7/2017 | Xie et al. |
| 2016/0023912 | A1 | 1/2016 | Goel et al. |
| 2016/0296924 | A1 | 10/2016 | Li et al. |

FOREIGN PATENT DOCUMENTS

| | | |
|---|---|---|
| WO | WO 2016/014702 A1 | 1/2016 |
| WO | WO 2016/085538 A1 | 6/2016 |
| WO | WO 2016/096653 A1 | 6/2016 |
| WO | WO 2016/166245 | 10/2016 |

OTHER PUBLICATIONS

International Preliminary Report on Patentability and Written Opinion dated Jul. 4, 2019 in PCT/CN2017/115938 (English Translation only), 6 pages.

International Search Report dated Mar. 23, 2018 in PCT/CN2017/115938 (submitting English translation only), 4 pages.

Beale, A.M., et al., "Recent advances in automotive catalysis for $NO_x$ emission control by small-pore microporous materials", Chemical Society Reviews, 2015, vol. 44, pp. 7371-7405 with cover page.

Kwak, J.H., et al., "Excellent activity and selectivity of Cu-SSZ-13 in the selective catalytic reduction of $NO_x$ with $NH_3$", Journal of Catalysis, 2010, vol. 275, pp. 187-190.

Fickel, D.W., et al., "Copper Coordination in Cu-SSZ-13 and Cu-SSZ-16 Investigated by Variable-Temperature XRD", J. Phys. Chem., 2010, vol. 114, pp. 1633-1640.

Fickel, D.W., et al., "The ammonia selective catalytic reduction activity of copper-exchanged small-pore zeolites", Applied Catalysis B: Environmental, 2011, vol. 102, pp. 441-448.

Deka, U., et al., "Confirmation of Isolated $Cu^{2+}$ Ions in SSZ-13 Zeolite as Active Sites in $NH_3$—Selective Catalytic Reduction", The Journal of Physical Chemistry, 2012, vol. 116, pp. 4809-4818.

Kispersky, V.F., et al., "Low absorption vitreous carbon reactors for operando XAS: a case study on Cu/Zeolites for selective catalytic reduction of $NO_x$ by $NH_3$", Phys. Chem. Chem. Phys., 2012, vol. 14, pp. 2229-2238.

Gao, F., et al., "Structure-activity relationships in $NH_3$-SCR over Cu-SSZ-13 as probed by reaction kinetics and EPR studies", Journal of Catalysis, 2013, vol. 300, pp. 20-29.

Zones, S.I., "Direct Hydrothermal Conversion of Cubic P Zeolite to Organozeolite SSZ-13", J. Chem. Soc. Faraday Trans., 1990, vol. 86 No. 20, pp. 3467-3472.

Zones, S.I., "Conversion of Faujasites to High-silica Chabazite SSZ-13 in the Presence of N,N,N-Trimethyl-1-adamantammonium Iodide", J. Chem. Soc. Faraday Trans., 1991, vol. 87 No. 22, pp. 3709-3716.

Díaz-Cabañas, M.-J., et al., "Synthesis and structure of pure $SiO_2$ chabazite: the $SiO_2$ polymorph with the lowest framework density", Chem. Commun., 1998, vol. 17, pp. 1881-1882.

Zones, S.I., et al., "Novel zeolite transformations: The template-mediated conversion of Cubic P zeolite to SSZ-13", Zeolites, May 1988, vol. 8, pp. 166-174.

Honda, K., et al., "Role of Structural Similarity Between Starting Zeolite and Product Zeolite in the Interzeolite Conversion Process", Journal of Nanoscience and Nanotechnology, 2013, vol. 13, pp. 3020-3026 with cover page.

Nedyalkova, R., et al., "Interzeolite Conversion of FAU Type Zeolite into CHA and its Application in $NH_3$-SCR", Top Catal, 2013, vol. 56, pp. 550-557.

Sano, T., et al., "High Potential of Interzeolite Conversion Method for Zeolite Synthesis", Journal of Japan Petroleum Institute, 2013, vol. 56 No. 4, pp. 183-197.

Van Tendeloo, L., et al., "Alkaline cations directing the transformation of FAU zeolites into five different framework types", Chem. Comm., 2013, vol. 49, pp. 11737-11739.

Itakura, M., et al., "Synthesis of high-silica CHA type zeolite by interzeolite conversion of FAU type zeolite in the presence of seed crystals", Microporous and Mesoporous Materials, 2011, vol. 144, pp. 91-96.

Meng, X., et al., "Green Routes for Synthesis of Zeolites", Chemical Reviews, 2014, vol. 114, pp. 1521-1543.

Xie, B., et al., "Organotemplate-Free and Fast Route for Synthesizing Beta Zeolite", Chemistry of Materials, Jul. 22, 2008, vol. 20 No. 14, pp. 4533-4535.

Xie, B., et al., "Seed-directed synthesis of zeolites with enhanced performance in the absence of organic templates", Chem. Commun., 2011, vol. 47, pp. 3945-3947.

Zhang, H., et al., "Seed-Directed and Organotemplate-free Synthesis of Zeolites", Acta Chimica Sinica, 2012, vol. 70, pp. 2387-2392 (with English abstract).

Goel, S., et al., "Synthesis of Zeolites via Interzeolite Transformations without Organic Structure-Directing Agents", Chemistry of Materials, 2015, vol. 27, pp. 2056-5066.

Sonoda, T., et al., "Synthesis of High-silica AEI zeolites with enhanced thermal stability by hydrothermal conversion of FAU zeolites, and their activity in the selective catalytic reduction of $NO_x$ with $NH_3$", Journal of Materials Chemistry A, 2015, vol. 3, pp. 857-865.

(56) References Cited

OTHER PUBLICATIONS

Ren, L., et al., "Solvent-Free Synthesis of Zeolites from Solid Raw Materials", Journal of the American Chemical Society, 2012, vol. 134, pp. 15173-15176.
Wu, Q., et al., "Sustainable Synthesis of Zeolites without Addition of Both Organotemplates and Solvents", Journal of the American Chemical Society, 2014, vol. 136, pp. 4019-4025.
Wu, Q., et al., "Solvent-Free Synthesis of Zeolites from Anhydrous Starting Raw Solids", Journal of the American Chemical Society, 2015, vol. 137, pp. 1052-1055.
Zhu, L., et al., "Solvent-free synthesis of titanosilicate zeolites", Journal of Materials Chemistry A, 2015, vol. 3, pp. 14093-14095 with cover page.
Meng, X., et al., "Solvent-free synthesis of zeolite catalysts", Science China Chemistry, Jan. 2015, vol. 58 No. 1, pp. 6-13.
Wang, X., et al., "Atom-economical synthesis of a high silica CHA zeolite using a solvent-free route", Chem. Comm., 2015, vol. 51, pp. 16920-16923.
Jin, Y., et al., "Solvent-free Synthesis of Silicoaluminophosphate Zeolites", Angewandte Communications Int. Ed., 2013, vol. 52, pp. 9172-9175.
Jin, Y., et al., "Solvent-free Synthesis of Hierarchically Porous Aluminophosphate-Based Zeolites with AEL and AFI Structures", Chem. Eur. J., 2014, vol. 20, pp. 17616-17623.
U.S. Appl. No. 15/550,581, filed Aug. 11, 2017, US 2018-0036723 A1, Riedel, D., et al.
U.S. Appl. No. 15/264,428, filed Sep. 13, 2016, US 2017-0362513 A1, McGuire, R., et al.
U.S. Appl. No. 15/549,905, filed Aug. 9, 2017, US 2018-0022611 A1, Feyen, M., et al.
U.S. Appl. No. 15/752,991, filed Feb. 15, 2018, US 2018-0243691 A1, Mueller, U., et al.
U.S. Appl. No. 15/779,218, filed May 25, 2018, US 2018-0345245 A1, Maurer, S., et al.
U.S. Appl. No. 15/744,324, filed Jan. 12, 2018, US 2018-0208532 A1, Parvulescu, A.-N., et al.
U.S. Appl. No. 16/086,251, filed Sep. 18, 2018, Kalo, B.
U.S. Appl. No. 15/571,107, filed Nov. 1, 2017, US 2018-0170580 A1, Vautravers, N., et al.
U.S. Appl. No. 15/779,314, filed May 25, 2018, US 2018-0333696 A1, Burckhart, J., et al.
U.S. Appl. No. 16/060,260, filed Jun. 7, 2018, US 2018-0362353 A1, Vautravers, N., et al.
U.S. Appl. No. 16/076,600, filed Aug. 8, 2018, US 2019-0077779 A1, Riedel, D., et al.
U.S. Appl. No. 16/321,252, filed Jan. 28, 2019, US 2019-0169037 A1, Trukhan, N., et al.
U.S. Appl. No. 16/349,364, filed May 13, 2019, Parvulescu, A.-N., et al.
U.S. Appl. No. 16/461,134, filed May 15, 2019, Parvulescu, A.-N., et al.
U.S. Appl. No. 16/462,430, filed May 20, 2019, Parvulescu, A.-N., et al.
U.S. Appl. No. 16/308,730, filed Dec. 10, 2018, US 2019-0143272 A1, Trukhan, N., et al.
U.S. Appl. No. 15/775,657, filed May 11, 2018, US 2018-0328601 A1, Weickert, M., et al.
U.S. Appl. No. 16/060,739, filed Jun. 8, 2018, US 2018-0362357 A1, Feyen, M., et al.
U.S. Appl. No. 16/462,408, filed May 31, 2018, McGuire, R., et al.
U.S. Appl. No. 16/318,221, filed Jan. 16, 2019, US 2019-0169149 A1, Teles, J.H., et al.
U.S. Appl. No. 16/060,229, filed Jun. 7, 2018, US 2018-0362351 A1, Parvulescu, A.-N., et al.
U.S. Appl. No. 16/315,345, filed Jan. 4, 2019, Teles, J.H., et al.
U.S. Appl. No. 16/315,680, filed Jan. 7, 2019, US 2019-0210989 A1, Teles, J.H., et al.
U.S. Appl. No. 16/310,645, filed Dec. 17, 2018, Parvulescu, A.-N., et al.
U.S. Appl. No. 16/304,511, filed Nov. 26, 2018, US 2019-0134564 A1, Feyen, M., et al.
U.S. Appl. No. 16/469,782, filed Dec. 7, 2017, Schroeter, M.K., et al.
U.S. Appl. No. 16/464,894, filed Nov. 29, 2017, Parvulescu, A.N., et al.
U.S. Appl. No. 16/308,928, filed Dec. 11, 2018, US 2019-0144290 A1, Marx, S., et al.
U.S. Appl. No. 16/464,943, filed May 29, 2019, Parvulescu, A.-N., et al.
U.S. Appl. No. 16/464,966, filed May 29, 2019, Parvulescu, A.-N., et al.
U.S. Appl. No. 16/330,592, filed Mar. 5, 2019, Parvulescu, A.-N., et al.
U.S. Appl. No. 16/336,661, filed Mar. 26, 2019, Parvulescu, A.-N., et al.

* cited by examiner

US 10,870,583 B2

PROCESS FOR THE PRODUCTION OF A ZEOLITIC MATERIAL VIA SOLVENT-FREE INTERZEOLITIC CONVERSION

TECHNICAL FIELD

The present invention relates to a process for the preparation of a zeolitic material comprising $YO_2$ and $X_2O_3$ in it framework structure, wherein Y stands for a tetravalent element and X stands for a trivalent element, wherein said process comprises interzeolitic conversion of a first zeolitic material comprising $YO_2$ and $X_2O_3$ in its framework structure, wherein the first zeolitic material has a framework structure selected from the group consisting of FAU-, GIS-, MOR-, and LTA-type framework structures, including mixtures of two or more thereof to second zeolitic material comprising $YO_2$ and $X_2O_3$ in its framework structure, wherein the second zeolitic material has a different type of framework structure than the first zeolitic material. Furthermore, the present invention relates to a zeolitic material per se as obtainable and/or obtained according to the inventive process and to its use, in particular as a molecular sieve, as an adsorbent, for ion-exchange, or as a catalyst and/or as a catalyst support.

INTRODUCTION

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three letter code and are described in the Atlas of Zeolite Framework Types, 6th edition, Elsevier, London, England (2007).

Among said zeolitic materials, Chabazite is a well studied example, wherein it is the classical representative of the class of zeolitic materials having a CHA framework structure. Besides aluminosilicates such as Chabazite, the class of zeolitic materials having a CHA framework structure comprises a large number of compounds further comprising phosphorous in the framework structure are known which are accordingly referred to as silicoaluminophosphates (SAPO). In addition to said compounds, further molecular sieves of the CHA structure type are known which contain aluminum and phosphorous in their framework, yet contain little or no silica, and are accordingly referred to as aluminophosphates (APO). Zeolitic materials belonging to the class of molecular sieves having the CHA-type framework structure are employed in a variety of applications, and in particular serve as heterogeneous catalysts in a wide range of reactions such as in methanol to olefin catalysis and selective catalytic reduction of nitrogen oxides $NO_x$ to name some two of the most important applications. Zeolitic materials of the CHA framework type are characterized by three-dimensional 8-membered-ring (8MR) pore/channel systems containing double-six-rings (D6R) and cages.

Zeolitic materials having a CHA-type framework structure and in particular Chabazite with incorporated copper ions (Cu-CHA) are widely used as heterogeneous catalyst for the selective catalytic reduction (SCR) of $NO_x$ fractions in automotive emissions. Based on the small pore openings and the alignment of the copper ions in the CHA cages, these catalyst systems have a unique thermal stability, which tolerates temperatures higher than 700° C. in presence of $H_2O$.

Among zeolitic materials having the CHA-type framework structure, high silica aluminosilicate zeolite chabazite (CHA), SSZ-13, has a three-dimensional pore system with ellipsoidal-shaped large cages (6.7×10 Å) that are accessible via 8-membered ring windows (3.8×3.8 Å), which have attracted great interest because they exhibit extraordinary catalytic properties in selective catalytic reduction of $NO_x$ with $NH_3$ ($NH_3$—SCR) in recent years (cf. A. M. Beale et al. in Chem. Soc. Rev., 2015, 44, 7371-7405; J. H. Kwak et al. in J. Catal., 2010, 275, 187-190; D. W. Fickel et al. in J. Phys. Chem. C, 2010, 114, 1633-1640; D. W. Fickel et al. in App. Cata., B, 2011, 102, 441-448; U. Deka et al. in J. Phys. Chem. C, 2012, 116, 4809-4818; V. F. Kispersky et al. in Phys. Chem. Chem. Phys., 2012, 14, 2229-2238; F. Gao et al. in J. Catal., 2013, 300, 20-29). Generally, it was possible to synthesize high silica or pure siliceous SSZ-13 only in alkali or fluoride media using the N,N,N-trimethyl-1-adamantammonium cation as the organic template, wherein alternatively, high silica SSZ-13 was also prepared via interzeolite transformation from P and FAU zeolites (cf. U.S. Pat. Nos. 4,544,538; 4,665,110; S. I. Zones in J. Chem. Soc., Faraday Trans., 1990, 86, 3467; S. I. Zones in J. Chem. Soc., Faraday Trans., 1991, 87, 3709; M.-J. Diaz-Cabarias et al. in Chem. Commun., 1998, 17, 1881; S. I. Zones et al. in Zeolites, 1988, 8, 166). Interzeolite transformation, i.e. hydrothermal conversion of one zeolite into another, always occurs during the zeolite crystallization process since zeolites are kinetically (but not thermodynamically) stable toward conversion to denser framework structures (cf. also M. Itakura et al. in Micropor. Mesopor. Mater., 2011, 144, 91-96; K. Honda et al. in J. Nanosci. Nanotechnol., 2013, 13, 3020-3026; R. Nedyalkova et al. in Top. Catal., 2013, 56, 550-557; T. Sano et al. in J. Jpn Pet. Inst. 2013, 56, 183-197; L. Van Tendeloo et al. in Chem. Commun., 2013, 49, 11737-11739).

The interzeolite transformation of aluminum-rich zeolites (P) or high silica FAU to SSZ-13 in the presence of N,N,N-trimethyl-1-adamantammonium cations has been intensively investigated in the last century. However, the expensive cost of the N,N,N-trimethyl-1-adamantammonium cation still strongly hinder its wide applications. Recently, M. Itakura et al. in Micropor. Mesopor. Mater., 2011, 144, 91-96 reported the synthesis of high-silica CHA type zeolite from FAU type zeolite using the benzyltrimethylammonium cation instead of the expensive N,N,N-trimethyl-1-adamantammonium cation. Seeds have been used in the above interzeolite transformation to efficiently shorten the crystallization time.

Much effort has been devoted to the development of organotemplate-free synthesis protocols to decrease such costs as well as the emissions of toxic species in gaseous and water streams generated during the synthesis or subsequent treatments required to decompose organic species contained within zeolite voids (cf. X. Meng et al. in Chem. Rev., 2014, 114, 1521-1543; B. Xie et al. in Chem. Mater., 2008, 20, 4533-4535; B. Xie et al. in Chem. Commun., 2011, 47, 3945-3947; H. Zhang et al. in Acta Chim. Sinica, 2012, 70, 2387-2392). In this respect, seed-directed synthesis has proven to be a generalized and efficient route for organotemplate-free preparation of zeolites. S. Goel et al. in Chem. Mater., 2015, 27, 2056-2066 and WO 2016/014702 A1, on the other hand, relates to the synthesis of zeolites via interzeolite transformations in the absence of organic templates, which succeeded in generating MFI-, MTW-, and STF-type framework structures, but partially failed in generating the CHA-type framework structure since substantial amounts of Mordenite or amorphous silica were still in the final products. Furthermore, the yields were low, mainly in the range of 40-60%. Sonoda et al. in *J. Mater. Chem. A*, 2015, 3, 857-865, relates to the synthesis of high-silica AEI zeolites by hydrothermal conversion of FAU zeolites using tetraethylphosphonium cations as organotemplates, as well as to their use in the selective catalytic reduction of $NO_x$ with $NH_3$.

To increase the yield in the production of specific zeolitic materials, L. Ren et al. in *J. Am. Chem. Soc.*, 2012, 134, 15173 developed a generalized, simple and efficient solvent-free route (cf. also Q. Wu et al. in *J. Am. Chem. Soc.*, 2014, 136, 4019; Q. Wu et al. in *J. Am. Chem. Soc.*, 2015, 137, 1052-1055; L. Zhu et al. in *J. Mater. Chem. A*, 2015, 3, 14093-14095; X. Meng et al. in *Sci. China Chem.*, 2015, 58, 6-13; X. Wang et al. in *Chem. Commun.* 2015, 51, 16920-16923). The first successful example of this strategy was for producing aluminosilicates such as ZSM-5, Beta, and Mordenite. In Y. Jin et al. in *Angew. Chem. Int. Ed.*, 2013, 52, 9172, as well as in Y. Jin et al. in *Chem. Euro. J.*, 2014, 20, 17616-17623, this methodology was extended to synthesize aluminophosphate based zeolites such as SAPO-34, SAPO-11, and SAPO-5. More recently, a solvent-free route for synthesizing a high silica CHA zeolite using a low-cost organic template of N,N,N-dimethylethylcyclohexylammonium bromide has been reported, but it still requires a long crystallization time of 5 days.

Consequently, there remains a need for a cost-effective process for the production of zeolitic materials. Furthermore, there is an ongoing need for improved zeolitic materials, and in particular for materials having the CHA-type framework structure, more specifically with respect to the catalytic properties for use in a variety of application and in particular for use in the treatment of $NO_x$ in automotive exhaust gas a catalyst and/or catalyst support. This applies in particular in view of national legislation and environmental policy which require increasing effectiveness of environmental catalysts such as Cu-Chabazite and related zeolitic materials.

DETAILED DESCRIPTION

It was therefore the object of the present invention to provide an improved synthesis methodology for the production of zeolitic materials which affords the desired materials in a highly time- and cost-effective manner, and which is furthermore environmentally friendly. Furthermore, it was the object of the present invention to provide an improved zeolitic material, in particular relative to its catalytic properties, and in particular relative to its performance in the conversion of $NO_x$ in selective catalytic reduction (SCR). Thus, it has surprisingly been found that a zeolitic material may be obtained via interzeolitic transformation from a reaction mixture containing very low amounts of water, i.e. according to a substantially solvent-free synthetic methodology. Furthermore, it has quite unexpectedly been found that said process according to the present invention not only allows for the use of higher crystallization temperatures than conventional interzeolitic transformation under hydrothermal reaction conditions, but furthermore affords the desired material in only a fraction of the time. Finally, it has very surprisingly been found that the zeolitic materials obtained according to the process of the present invention display improved properties, in particular with respect to their activity in catalytic conversion reaction when employed as a catalyst or catalyst support such as in the catalytic conversion of $NO_x$ in SCR.

Thus, the present invention relates to a process for the preparation of a zeolitic material comprising $YO_2$ and $X_2O_3$ in its framework structure, wherein Y stands for a tetravalent element and X stands for a trivalent element, wherein said process comprises:

(1) preparing a mixture comprising one or more structure directing agents, seed crystals, and a first zeolitic material comprising $YO_2$ and $X_2O_3$ in its framework structure, wherein the first zeolitic material has a framework structure selected from the group consisting of FAU-, GIS-, MOR-, and LTA-type framework structures, including mixtures of two or more thereof;

(2) heating the mixture obtained in (1) for obtaining a second zeolitic material comprising $YO_2$ and $X_2O_3$ in its framework structure, wherein the second zeolitic material obtained in (2) has a different type of framework structure than the first zeolitic material contained in the mixture obtained in (1);

wherein the mixture prepared in (1) and heated in (2) contains 1000 wt.-% or less of $H_2O$ based on 100 wt.-% of $YO_2$ in the framework structure of the first zeolitic material.

According to the present invention, the mixture prepared in (1) and heated in (2) contains 1000 wt.-% or less of $H_2O$ based on 100 wt.-% of $YO_2$ in the framework structure of the first zeolitic material. It is, however, preferred according to the inventive process that the mixture prepared in (1) and heated in (2) contains 1 to 800 wt.-% of $H_2O$, and more preferably 5 to 150 wt.-%, more preferably 10 to 600 wt.-%, more preferably 20 to 500 wt.-%, more preferably 30 to 400 wt.-%, more preferably 40 to 300 wt.-%, more preferably 50 to 250 wt.-%, more preferably 60 to 200 wt.-%, more preferably 65 to 170 wt.-%, more preferably 70 to 150 wt.-%, more preferably 75 to 140 wt.-%, more preferably 80 to 130 wt.-%, and more preferably 85 to 120 wt.-% of $H_2O$ based on 100 wt.-% of $YO_2$ in the framework structure of the first zeolitic material. According to the present invention it is however particularly preferred that the mixture prepared in (1) and heated in (2) contains 90 to 110 wt.-% of $H_2O$ based on 100 wt.-% of $YO_2$ in the framework structure of the first zeolitic material.

As regards the first zeolitic material contained in the mixture obtained in (1), in principle, no particular restrictions apply as to the number or type of zeolitic materials which may be employed, provided that they respectively have a framework structure selected from the group consisting of FAU-, GIS-, MOR-, and LTA-type framework structures, including mixtures of two or more thereo. According to the inventive process, it is however preferred that the first zeolitic material comprises one or more zeolitic materials having an FAU-type and/or a GIS-type framework structure, wherein more preferably the first zeolitic material has an FAU-type and/or a GIS-type framework structure. According to the present invention it is however particularly preferred that the first zeolitic material comprises one or more zeolitic materials having an FAU-type framework structure, wherein more preferably, the first zeolitic material has an FAU-type framework structure.

Within the meaning of the present invention, the designation of "an FAU-type" zeolitic material generally refers to a zeolitic material displaying the CHA framework structure. Same applies accordingly with regard to the other structure types defined in the present application, and in particular to the GIS, MOR, LTA, CHA, and AEI structure types.

According to the present invention, the second zeolitic material obtained in (2) has a different type of framework structure than the first zeolitic material contained in the mixture obtained in (1). Within the meaning of the present invention, the term "different type of framework structure" refers to the structure type which a zeolitic material may have as assigned by three letter code and as described in the Atlas of Zeolite Framework Types, 6th edition, Elsevier, London, England (2007). Thus, according to the present invention, the second zeolitic material obtained in (2) displays a different framework structure type than the structure type of the first zeolitic material. In cases in which the first zeolitic material comprises more than one zeolitic material, wherein the zeolitic materials are of different structure types, the second zeolitic material obtained in (2) displays a different framework structure type than at least one of the structure types of the first zeolitic material. Thus, according to the present invention, the second zeolitic material obtained in (2) displays a structure type other than the FAU-, GIS-, MOR-, and/or LTA-type framework structures which the first zeolitic material displays.

As regards the zeolitic material having an FAU-type framework structure which is preferably comprised in the first zeolitic material, and which even more preferably the first zeolitic material consists of, in principle no particular restrictions apply neither with respect to the number, nor with respect to the type of zeolitic material having an FAU-type framework structure which may be comprised in the first zeolitic material or which the first zeolitic material may preferably consist of. Thus, by way of example, the first zeolitic material may comprise one or more zeolites, and is preferably selected from the group consisting of ZSM-3, Faujasite, [Al—Ge—O]-FAU, CSZ-1, ECR-30, Zeolite X, Zeolite Y, LZ-210, SAPO-37, ZSM-20, Na—X, US-Y, Na—Y, [Ga—Ge—O]-FAU, Li-LSX, [Ga—Al—Si—O]-FAU, and [Ga—Si—O]-FAU, including mixtures of two or more thereof, wherein preferably the first zeolitic material is selected from the group consisting of ZSM-3, Faujasite, CSZ-1, ECR-30, Zeolite X, Zeolite Y, LZ-210, ZSM-20, Na—X, US-Y, Na—Y, and Li-LSX, including mixtures of two or more thereof, more preferably from the group consisting of Faujasite, Zeolite X, Zeolite Y, Na—X, US-Y, and Na—Y, including mixtures of two or more thereof, and more preferably from the group consisting of Faujasite, Zeolite X, and Zeolite Y, including mixtures of two or more thereof. According to the present invention it is particularly preferred that the first zeolitic material having an FAU-type framework structure comprises zeolite X and/or zeolite Y, preferably zeolite Y, wherein more preferably the first zeolitic material having an FAU-type framework structure is zeolite X and/or zeolite Y, preferably zeolite Y.

Independently thereof, same applies accordingly relative to the zeolitic material having a GIS-type framework structure which is preferably comprised in the first zeolitic material, and of which even more preferably the first zeolitic material consists of. Thus, in principle, not particular restrictions apply neither with respect to the number, nor with respect to the type of zeolitic material having a GIS-type framework structure which may be comprised in the first zeolitic material or which the first zeolitic material may preferably consist of. Thus, by way of example, the first zeolitic material may comprise one or more zeolites, and is preferably selected from the group consisting of zeolite P, TMA-gismondine, Na—P1, Amicite, Gobbinsite, High-silica Na—P, Na—P2, SAPO-43, Gismondine, MAPSO-43, MAPSO-43, Garronite, Synthetic amicite, Synthetic garronite, Synthetic gobbinsite, [Ga—Si—O]-GIS, Synthetic Ca-garronite, Low-silica Na—P (MAP), [Al—Ge—O]-GIS, including mixtures of two or more thereof, preferably from the group consisting of zeolite P, TMA-gismondine, Na—P1, Amicite, Gobbinsite, High-silica Na—P, Na—P2, Gismondine, Garronite, Synthetic amicite, Synthetic garronite, Synthetic gobbinsite, [Ga—Si—O]-GIS, Synthetic Ca-garronite, [Al—Ge—O]-GIS, including mixtures of two or more thereof, more preferably from the group consisting of zeolite P, TMA-gismondine, Na—P1, Amicite, Gobbinsite, High-silica Na—P, Na—P2, Gismondine, Garronite, Synthetic amicite, Synthetic garronite, Synthetic gobbinsite, Synthetic Ca-garronite, including mixtures of two or more thereof, and more preferably from the group consisting of zeolite P, Na—P1, High-silica Na—P, Na—P2, including mixtures of two or more thereof, wherein more preferably the first zeolitic material having a GIS-type framework structure comprises zeolite P. According to the present invention it is particularly preferred that the first zeolitic material having a GIS-type framework structure is zeolite P.

Again, independently thereof, same applies accordingly relative to the zeolitic material having an MOR-type framework structure which is preferably comprised in the first zeolitic material, and of which even more preferably the first zeolitic material consists of. Thus, in principle, not particular restrictions apply neither with respect to the number, nor with respect to the type of zeolitic material having an MOR-type framework structure which may be comprised in the first zeolitic material or which the first zeolitic material may preferably consist of. Thus, by way of example, the first zeolitic material may comprise one or more zeolites, and is preferably selected from the group consisting of Mordenite, [Ga—Si—O]-MOR, Maricopaite, Ca-Q, LZ-211, Na-D, RMA-1, including mixtures of two or more thereof, wherein preferably the first zeolitic material having an MOR-type framework structure comprises Mordenite. According to the present invention it is particularly preferred that the first zeolitic material having an MOR-type framework structure is Mordenite.

Furthermore, and again independently thereof, same applies accordingly relative to the zeolitic material having an LTA-type framework structure which is preferably comprised in the first zeolitic material, and of which even more preferably the first zeolitic material consists of. Thus, in principle, not particular restrictions apply neither with respect to the number, nor with respect to the type of zeolitic material having an LTA-type framework structure which may be comprised in the first zeolitic material or which the first zeolitic material may preferably consist of. Thus, by way of example, the first zeolitic material may comprise one or more zeolites, and is preferably selected from the group consisting of Linde Type A (zeolite A), Alpha, [Al—Ge—O]-LTA, N-A, LZWO 215, SAPO-42, ZK-4, ZK-21, Dehyd. Linde Type A (dehyd. zeolite A), ZK-22, ITQ-29, UZM-9, including mixtures of two or more thereof, preferably from the group consisting of Linde Type A, Alpha, N-A, LZ-215, SAPO-42, ZK-4, ZK-21, Dehyd. Linde Type A, ZK-22, ITQ-29, UZM-9, including mixtures of two or more thereof, more preferably from the group consisting of Linde Type A, Alpha, N-A, LZ-215, ZK-4, ZK-21, Dehyd. Linde Type A, ZK-22, ITQ-29, UZM-9, including mixtures of two or more thereof, more preferably from the group consisting of Linde Type A, Alpha, N-A, LZ-215, ZK-4, ZK-21, ZK-22, ITQ-29, UZM-9, including mixtures of two or more thereof.

As noted in the foregoing, there is no particular restriction according to the present invention relative to the second zeolitic material which is obtained in (2) from heating the mixture obtained in (1), provided that it has a different type of framework structure that the first zeolitic material. It is, however, preferred according to the present invention that the second zeolitic material obtained in (2) has a CHA-type framework structure, wherein preferably the zeolitic material having a CHA-type framework structure is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li-Na| [A-Si—O]-CHA, (Ni(deta)2)-UT-6, SSZ-13, and SSZ-62, including mixtures of two or more thereof, more preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof, more preferably from the group consisting of Chabazite, Linde D, Linde R, SAPO-34, SSZ-13, and SSZ-62, including mixtures of two or more thereof, and more preferably from the group consisting of Chabazite, SSZ-13, and SSZ-62, including mixtures of two or three thereof. According to the present invention it is particularly preferred that the second zeolitic material obtained in (2) comprises chabazite and/or SSZ-13, preferably SSZ-13, wherein more preferably the second zeolitic material obtained in (2) is chabazite and/or SSZ-13, preferably SSZ-13.

According to the present invention, no particular restrictions apply relative to the one or more structure directing agents which may be comprised in the mixture prepared in (1), provided that a second zeolitic material having a different type of framework structure than the first zeolitic material is obtained in (2). It is, however, preferred according to the inventive process that the one or more structure directing agents contained in the mixture obtained in (1) comprises one or more tetraalkylammonium cation $R^1R^2R^3R^4N^+$-containing compounds, wherein $R^1$, $R^2$, and $R^3$ independently from one another stand for alkyl, and wherein $R^4$ stands for cycloalkyl.

As regards the preferred use of one or more tetraalkylammonium cation $R^1R^2R^3R^4N^+$-containing compounds, wherein $R^1$, $R^2$, and $R^3$ independently from one another stand for alkyl, and wherein $R^4$ stands for cycloalkyl, it is further preferred that $R^1$ and $R^2$ independently from one another stand for optionally substituted and/or optionally branched $(C_1-C_6)$alkyl, preferably $(C_1-C_5)$alkyl, more preferably $(C_1-C_4)$alkyl, more preferably $(C_1-C_3)$alkyl, and more preferably for optionally substituted methyl or ethyl. According to the present invention it is particularly preferred that $R^1$ and $R^2$ independently from one another stand for optionally substituted methyl or ethyl, preferably unsubstituted methyl or ethyl, wherein more preferably $R^1$ and $R^2$ independently from one another stand for optionally substituted methyl, and preferably for unsubstituted methyl.

As regards the preferred use of one or more tetraalkylammonium cation $R^1R^2R^3R^4N^+$-containing compounds, wherein $R^1$, $R^2$, and $R^3$ independently from one another stand for alkyl, and wherein $R^4$ stands for cycloalkyl, it is further preferred that $R^3$ stands for optionally substituted and/or optionally branched $(C_1-C_6)$alkyl, preferably $(C_1-C_5)$ alkyl, more preferably $(C_1-C_4)$alkyl, more preferably $(C_1-C_3)$alkyl, and more preferably for optionally substituted methyl or ethyl. According to the present invention it is particularly preferred that $R^3$ stands for optionally substituted ethyl, preferably unsubstituted ethyl. Furthermore and independently thereof, it is preferred that $R^4$ stands for optionally heterocyclic and/or optionally substituted 5- to 8-membered cycloalkyl, preferably for 5- to 7-membered cycloalkyl, and more preferably for 5- or 6-membered cycloalkyl. According to the present invention, it is particularly preferred that $R^4$ stands for optionally heterocyclic and/or optionally substituted 6-membered cycloalkyl, preferably optionally substituted cyclohexyl, and more preferably unsubstituted cyclohexyl.

Thus, as regards the preferred use of one or more tetraalkylammonium cation $R^1R^2R^3R^4N^+$-containing compounds, wherein $R^1$, $R^2$, and $R^3$ independently from one another stand for alkyl, and wherein $R^4$ stands for cycloalkyl, it is particularly preferred that the one or more tetraalkylammonium cation $R^1R^2R^3R^4N$-containing compounds comprise one or more N,N,N-tri($C_1$-$C_4$)alkyl-($C_5$-$C_7$)cycloalkylammonium compounds, preferably one or more N,N,N-tri($C_1$-$C_3$)alkyl-($C_5$-$C_6$)cycloalkylammonium compounds, more preferably one or more N,N,N-tri($C_1$-$C_2$)alkyl-($C_5$-$C_6$)cycloalkylammonium compounds, more preferably one or more N,N,N-tri($C_1$-$C_2$)alkyl-cyclopentylammonium and/or one or more N,N,N-tri($C_1$-$C_2$)alkyl-cyclohexylammonium compounds, more preferably one or more compounds selected from N,N,N-triethyl-cyclohexylammonium, N,N-diethyl-N-methyl-cyclohexylammonium, N,N-dimethyl-N-ethyl-cyclohexylammonium, N,N,N-trimethyl-cyclohexylammonium compounds, and mixtures of two or more thereof, wherein more preferably the one or more tetraalkylammonium cation $R^1R^2R^3R^4N^+$-containing compounds comprise one or more N,N,dimethyl-N-ethyl-cyclohexylammonium compounds.

As regards the preferred use of one or more tetraalkylammonium cation $R^1R^2R^3R^4N^+$-containing compounds, wherein $R^1$, $R^2$, and $R^3$ independently from one another stand for alkyl, and wherein $R^4$ stands for cycloalkyl according to any of the particular and preferred embodiments defined in the present application, it is preferred that the one or more tetraalkylammonium cation $R^1R^2R^3R^4N^+$-containing compounds are salts, preferably one or more salts selected from the group consisting of halides, sulfate, nitrate, phosphate, acetate, and mixtures of two or more thereof, more preferably from the group consisting of bromide, chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or bromides, and more preferably tetraalkylammonium bromides.

As noted in the foregoing, according to the present invention, no particular restrictions apply relative to the one or more structure directing agents which may be comprised in the mixture prepared in (1), provided that a second zeolitic material having a different type of framework structure than the first zeolitic material is obtained in (2). According to the present invention it is, however, further preferred that the one or more structure directing agents contained in the mixture obtained in (1) comprises one or more tetraalkylammonium cation $R^1R^2R^3R^4N^+$-containing compounds, wherein $R^1$, $R^2$, and $R^3$ independently from one another stand for alkyl, and wherein $R^4$ stands for adamantyl and/or benzyl, preferably for 1-adamantyl.

As regards the preferred use of one or more tetraalkylammonium cation $R^1R^2R^3R^4N^+$-containing compounds, wherein $R^1$, $R^2$, and $R^3$ independently from one another stand for alkyl, and wherein $R^4$ stands for adamantyl and/or benzyl, it is further preferred that $R^1$, $R^2$, and $R^3$ independently from one another stand for optionally substituted and/or optionally branched $(C_1-C_6)$alkyl, preferably $(C_1-C_5)$ alkyl, more preferably $(C_1-C_4)$alkyl, more preferably $(C_1-C_3)$alkyl, and more preferably for optionally substituted methyl or ethyl. According to the present invention it is particularly preferred that $R^1$, $R^2$, and $R^3$ independently from one another stand for optionally substituted methyl or ethyl, preferably unsubstituted methyl or ethyl, wherein more preferably $R^1$, $R^2$, and $R^3$ independently from one another stand for optionally substituted methyl, and preferably for unsubstituted methyl. Furthermore and independently thereof, it is preferred that $R^4$ stands for optionally heterocyclic and/or optionally substituted adamantyl and/or benzyl, preferably for optionally heterocyclic and/or optionally substituted 1-adamantyl, more preferably for optionally substituted adamantyl and/or benzyl, and more preferably for optionally substituted 1-adamantyl. According to the present invention, it is particularly preferred that $R^4$ stands for unsubstituted adamantyl and/or benzyl, and more preferably for unsubstituted 1-adamantyl.

Thus, as regards the preferred use of one or more tetraalkylammonium cation $R^1R^2R^3R^4N^+$-containing compounds, wherein $R^1$, $R^2$, and $R^3$ independently from one another stand for alkyl, and wherein $R^4$ stands for adamantyl, it is particularly preferred that the one or more tetraalkylammonium cation $R^1R^2R^3R^4N^+$-containing compounds comprise one or more N,N,N-tri($C_1$-$C_4$)alkyl-1-adamantammonium compounds, preferably one or more N,N,N-tri($C_1$-$C_3$)alkyl-1-adamantammonium compounds, more preferably one or more N,N,N-tri($C_1$-$C_2$)alkyl-1-adamantammonium compounds, more preferably one or more N,N,N-tri($C_1$-$C_2$) alkyl-1-adamantammonium and/or one or more N,N,N-tri ($C_1$-$C_2$)alkyl-1-adamantammonium compounds, more preferably one or more compounds selected from N,N,N-triethyl-1-adamantammonium, N,N,N-diethyl-N-methyl-1-adamantammonium, N,N,N-dimethyl-N-ethyl-1-adamantammonium, N,N,N-trimethyl-1-adamantammonium compounds, and mixtures of two or more thereof, wherein more preferably the one or more tetraalkylammonium cation $R^1R^2R^3R^4N^+$-containing compounds comprise one or more N,N,N-trimethyl-1-adamantammonium compounds.

As regards the preferred use of one or more tetraalkylammonium cation $R^1R^2R^3R^4N^+$-containing compounds, wherein $R^1$, $R^2$, and $R^3$ independently from one another stand for alkyl, and wherein $R^4$ stands for adamantyl and/or benzyl according to any of the particular and preferred embodiments defined in the present application, it is preferred that the one or more tetraalkylammonium cation $R^1R^2R^3R^4N^+$-containing compounds are salts, preferably one or more salts selected from the group consisting of halides, sulfate, nitrate, phosphate, acetate, and mixtures of two or more thereof, more preferably from the group consisting of bromide, chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or bromides, and more preferably tetraalkylammonium hydroxides.

As noted above, there is again no particular restriction according to the present invention relative to the second zeolitic material which is obtained in (2) from heating the mixture obtained in (1), provided that it has a different type of framework structure that the first zeolitic material. According to the present invention it is, however, further preferred that the second zeolitic material obtained in (2) has an AEI-type framework structure, wherein preferably the zeolitic material having an AEI-type framework structure is selected from the group consisting of SSZ-39, SAPO-18, SIZ-8, including mixtures of two or more thereof. According to the present invention it is, however, particularly preferred that the second zeolitic material obtained in (2) SSZ-39, wherein more preferably the second zeolitic material obtained in (2) is SSZ-39.

Again, as noted in the foregoing, according to the present invention, no particular restrictions apply relative to the one or more structure directing agents which may be comprised in the mixture prepared in (1), provided that a second zeolitic material having a different type of framework structure than the first zeolitic material in obtained in (2). Thus, according to the present invention it is further preferred that the one or more structure directing agents contained in the mixture obtained in (1) comprises one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain.

As regards the preferred use of one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain, it is further preferred that $R^1$ and $R^2$ independently from one another stand for optionally substituted and/or optionally branched ($C_1$-$C_5$)alkyl, preferably ($C_1$-$C_5$)alkyl, more preferably ($C_1$-$C_4$)alkyl, more preferably ($C_1$-$C_3$)alkyl, and more preferably for optionally substituted methyl or ethyl. According to the present invention it is particularly preferred that $R^1$ and $R^2$ independently from one another stand for optionally substituted methyl or ethyl, preferably unsubstituted methyl or ethyl, wherein more preferably $R^1$ and $R^2$ independently from one another stand for optionally substituted methyl, and preferably for unsubstituted methyl.

As regards the preferred use of one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain, it is further preferred that $R^3$ and $R^4$ form a common derivatized or underivatized, preferably underivatized alkyl chain, preferably a common ($C_4$-$C_6$)alkyl chain, more preferably a common ($C_4$-$C_7$)alkyl chain, more preferably a common ($C_4$-$C_6$)alkyl chain, wherein more preferably said common alkyl chain is a derivatized or underivatized, preferably underivatized $C_4$ or $C_5$ alkyl chain. According to the present invention, it is particularly preferred that $R^3$ and $R^4$ form a common derivatized or underivatized, preferably underivatized $C_5$ alkyl chain.

Thus, as regards the preferred use of one or more tetraalkylammonium cation $R^1R^2R^3R^4N^{+*}$-containing compounds, wherein $R^1$, $R^2$, $R^3$ and $R^4$ independently from one another stand for alkyl, and wherein $R^3$ and $R^4$ form a common alkyl chain, it is particularly preferred that the one or more tetraalkylammonium cation $R^1R^2R^3R^4N^+$-containing compounds comprise one or more ammonium compounds selected from the group consisting of derivatized or underivatized, preferably underivatized N,N-di($C_1$-$C_4$)alkyl-2,6-di($C_1$-$C_4$)alkylpyrrolidinium compounds, N,N-di ($C_1$-$C_4$)alkyl-2,6-di($C_1$-$C_4$)alkylpiperidinium compounds, N,N-di($C_1$-$C_4$)alkyl-2,6-di($C_1$-$C_4$)alkylhexahydroazepinium compounds, and mixtures of two or more thereof, preferably from the group consisting of N,N-di($C_1$-$C_4$)alkyl-2,6-di($C_1$-$C_4$)alkylpyrrolidinium compounds, N,N-di($C_1$-$C_4$)alkyl-2,6-di($C_1$-$C_4$)alkylpiperidinium compounds, N,N-di($C_1$-$C_4$)alkyl-2,6-di($C_1$-$C_4$)alkylhexahydroazepinium compounds, and mixtures of two or more thereof, more preferably from the group consisting of N,N-di($C_1$-$C_3$)alkyl-2,6-di($C_1$-$C_3$)alkylpyrrolidinium compounds, N,N-di($C_1$-$C_3$)alkyl-2,6-di($C_1$-$C_3$)alkylpiperidinium compounds, N,N-di($C_1$-$C_3$)alkyl-2,6-di($C_1$-$C_3$) alkylhexahydroazepinium compounds, and mixtures of two or more thereof, more preferably from the group consisting of N,N-di($C_1$-$C_2$)alkyl-2,6-di($C_1$-$C_2$)alkylpyrrolidinium compounds, N,N-di($C_1$-$C_2$)alkyl-2,6-di($C_1$-$C_2$)alkylpiperidinium compounds, N,N-di($C_1$-$C_2$)alkyl-2,6-di($C_1$-$C_2$)alkylhexahydroazepinium compounds, and mixtures of two or more thereof, more preferably from the group consisting of N,N-di($C_1$-$C_2$)alkyl-2,6-di($C_1$-$C_2$)alkylpiperidinium compounds, and mixtures of two or more thereof, wherein more preferably the one or more tetraalkylammonium cation $R^1R^2R^3R^4N^+$-containing compounds comprise one or more N,N-dimethyl-2,6-dimethylpiperidinium compounds.

As regards the preferred use of one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain according to any of the particular and preferred embodiments defined in the present application, it is preferred that the one or more tetraalkylammonium cation $R^1R^2R^3R^4N^+$-containing compounds are salts, preferably one or more salts selected from the group consisting of halides, sulfate, nitrate, phosphate, acetate, and mixtures of two or more thereof, more preferably from the group consisting of bromide, chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or bromides, and more preferably tetraalkylammonium hydroxides.

According to the present invention, there is no particular restriction as to the one or more elements for which Y stands, provided that said element is a tetravalent element and that it is comprised as $YO_2$ in the framework structure of both the first and second zeolitic materials. In particular, within the meaning of the present invention, $YO_2$ is at least partially and preferably entirely comprised in the framework structure of the first and second zeolitic materials as structure building element, as opposed to non-framework elements which can be present in the pores and cavities formed by the framework structure and typical for zeolitic materials in general. Thus, taking into account the aforementioned, Y may stand for any conceivable tetravalent element, Y standing either for a single or several tetravalent elements. Preferred tetravalent elements according to the present invention include Si, Sn, Ti, Zr, Ge, as well as combinations of any two or more thereof. According to the present invention, it is particularly preferred that Y comprises Si and even more preferably that Y is Si.

According to the present invention, there is also no particular restriction as to the one or more elements for which X stands, provided that said element is a trivalent element and that it is comprised as $X_2O_3$ in the framework structure of both the first and second zeolitic materials. In particular, within the meaning of the present invention, $X_2O_3$ is at least partially and preferably entirely comprised in the framework structure of the first and second zeolitic materials as structure building element, as opposed to non-framework elements which can be present in the pores and cavities formed by the framework structure and typical for zeolitic materials in general. Thus, taking into account the aforementioned, X may stand for any conceivable trivalent element element, X standing either for a single or several trivalent elements. Preferred trivalent elements according to the present invention include Al, B, In, Ga, and mixtures of two or more thereof, wherein preferably X is Al and/or B. According to particularly preferred embodiments of the present invention, X comprises Al, wherein even more preferably X is Al.

Concerning $YO_2$: $X_2O_3$ molar ratio displayed by the framework structure of the first zeolitic material, any conceivable molar ratio may be adopted. Thus, by way of example, the $YO_2$: $X_2O_3$ molar ratio of the framework structure of the first zeolitic material may be comprised anywhere in the range of from 5 to 120, wherein preferably the $YO_2$: $X_2O_3$ molar ratio is comprised in the rage of from 8 to 80, more preferably from 10 to 50, more preferably from 13 to 40, more preferably from 15 to 30, and more preferably from 18 to 25. According to the present invention, it is particularly preferred that the $YO_2$: $X_2O_3$ molar ratio displayed by the framework structure of the first zeolitic material is in the range of from 20 to 23.

Furthermore, as regards the $R^1R^2R^3R^4N^+$: $YO_2$ molar ratio of the one or more tetraalkylammonium cations to $YO_2$ in the framework structure of the first zeolitic material displayed by the mixture prepared in (1) and heated in (2), no particular restrictions apply, such that the $R^1R^2R^3R^4N^+$: $YO_2$ molar ratio may by way of example be in the range of anywhere from 0.03 to 0.5, wherein preferably the $R^1R^2R^3R^4N^+$: $YO_2$ molar ratio is in the range of from 0.05 to 0.4, more preferably of from 0.08 to 0.3, more preferably of from 0.1 to 0.28, more preferably of from 0.12 to 0.26, more preferably of from 0.14 to 0.24, and more preferably of from 0.16 to 0.22. According to the present invention, it is particularly preferred that the $R^1R^2R^3R^4N^+$: $YO_2$ molar ratio of the one or more tetraalkylammonium cations to $YO_2$ in the framework structure of the first zeolitic material in the mixture prepared in (1) is in the range of from 0.18 to 0.2.

Concerning the further components which may be contained in the mixture prepared in (1) of the inventive process, again, no particular restrictions apply provided that a second zeolitic material having a different type of framework structure than the first zeolitic material is obtained in (2). Thus, to this effect, it is preferred according to the present invention that the mixture prepared in (1) and heated in (2) further comprises at least one source for $OH^-$, wherein said at least one source for $OH^-$ preferably comprises a metal hydroxide, more preferably a hydroxide of an alkali metal M, more preferably sodium and/or potassium hydroxide, and more preferably sodium hydroxide. According to the present invention, it is particularly preferred that the mixture prepared in (1) and heated in (2) further comprises sodium hydroxide as the at least one source for $OH^-$.

As regards the particular preferred embodiments of the present invention wherein the mixture prepared in (1) further comprises at least one source for $OH^-$, no particular restrictions apply as to the amounts in which it may be contained in the mixture. Thus, by way of example, the mixture prepared in (1) and heated in (2) may display an $OH^-$: $YO_2$ molar ratio in the range of anywhere from 0.01 to 0.5, wherein it is preferred according to the present invention that the $OH^+$: $YO_2$ molar ratio is in the range of from 0.05 to 0.3, and more preferably from 0.08 to 0.25, more preferably from 0.1 to 0.23, more preferably from 0.12 to 0.21, and more preferably from 0.13 to 0.19. According to the present invention, it is particularly preferred that the $OH^-$: $YO_2$ molar ratio of the mixture prepared in (1) is in the range of from 0.15 to 0.17. Within the meaning of the present invention, the $OH^-$: $YO_2$ molar ratio of the mixture prepared in (1) refers to the molar ratio of the OH ions contained in the mixture to $YO_2$ in the framework structure of the first zeolitic material contained in the mixture. Furthermore, according to the present invention, it is particularly preferred that the $OH^-$: $YO_2$ molar ratio is in one or more of the aforementioned ranges in instances wherein the seed crystals comprise a zeolitic material having a CHA-type framework structure.

According to the present invention it is alternatively preferred that the mixture prepared in (1) and heated in (2) displays an $OH^-$: $YO_2$ molar ratio in the range of from 0.05 to 2, and preferably from 0.1 to 1.7, more preferably from 0.3 to 1.5, more preferably from 0.5 to 1.3, more preferably from 0.7 to 1.2, more preferably from 0.8 to 1.1, more preferably from 0.85 to 1. According to said alternatively preferred embodiments of the inventive process, it is particularly preferred that the OH⁻ : YO$_2$ molar ratio of the mixture prepared in (1) is in the range of from 0.9 to 0.95. Furthermore, according to the present invention, it is particularly preferred that the OH YO$_2$ molar ratio is in one or more of the aforementioned alternatively preferred ranges in instances wherein the seed crystals comprise a zeolitic material having a AEI-type framework structure.

As regards the temperature of heating the mixture obtained in (1) in (2), no particular restrictions apply provided that a second zeolitic material having a different type of framework structure than the first zeolitic material is obtained in (2). Thus, to this effect, it is preferred according to the present invention that the heating in (2) is conducted at a temperature ranging from 80 to 250° C., wherein preferably the heating in (2) is conducted at a temperature from 90 to 230° C., more preferably from 100 to 210° C., more preferably from 110 to 200° C., more preferably from 115 to 190° C., more preferably from 120 to 180° C., more preferably from 125 to 170° C., more preferably from 130 to 160° C., and more preferably from 135 to 155° C. According to the inventive process it is particularly preferred that the heating in (2) is conducted at a temperature from 140 to 150° C.

Furthermore, as regards the duration of the heating performed in (2), again no particular restrictions apply provided that a second zeolitic material having a different type of framework structure than the first zeolitic material is obtained in (2). Thus, to this effect, it is preferred according to the present invention that the heating in (2) is conducted for a period in the range of from 3 h to 12 d, wherein preferably heating in (2) is conducted for a period in the range of from 6 h to 10 d, and more preferably from 12 h to 8 d, more preferably from 18 h to 6 d, more preferably from 1 to 5.5 d, more preferably from 1.5 to 5 d, more preferably from 2 to 4.5 d. According to the inventive process it is particularly preferred that heating in (2) is performed for a duration in the range of from 2.5 to 3.5 d.

Alternatively, however, it is preferred according to the present invention that the mixture obtained in (1) is heated in (2) at a higher temperature, and in particular at a temperature in the range of from 170 to 300° C., and more preferably from 180 to 290° C., more preferably from 190 to 280° C., more preferably from 200 to 275° C., more preferably from 210 to 270° C., more preferably from 215 to 265° C., more preferably from 220 to 260° C., more preferably from 225 to 255° C., and more preferably from 230 to 250° C. According to said alternatively preferred embodiments of the inventive process, it is particularly preferred that the mixture obtained in (1) is heated in (2) at a temperature in the range of from 235 to 245° C.

As regards the duration of heating according to the aforementioned particular and preferred embodiments of the inventive process wherein the mixture obtained in (1) is heated in (2) at a higher temperature, it is furthermore preferred that the duration of heating is brief, and in particular that the heating in (2) is only conducted for a period in the range of from 0.1 h to 6 h, and more preferably from 0.3 h to 4 h, more preferably from 0.5 h to 3 h, more preferably from 0.7 h to 2.5 h, more preferably from 0.8 to 2 h, more preferably from 0.85 to 1.5 h, and more preferably from 0.9 to 1.3 h. According to said alternative particular and preferred embodiments of the present invention wherein the mixture obtained in (1) is heated in (2) at a higher temperature, it is particularly preferred that heating of the mixture obtained in (1) in (2) is only conducted for a period in the range of from 0.95 to 1.1 h.

The apparatus which can be used in the present invention for heating in (2) is not particularly restricted, provided that a second zeolitic material having a different type of framework structure than the first zeolitic material is obtained in (2). It is, however, preferred according to the inventive process that heating in (2) is conducted under autogenous pressure, wherein preferably heating in (2) is performed in a pressure tight vessel, preferably in an autoclave.

No particular restrictions apply as to the further steps which the inventive may further comprise, in particular with respect to the work-up of the reaction product obtained in (2). Thus, it is for example preferred that the inventive process further comprises one or more steps aimed at the removal of the one or more structure directing agents from the at least partially microporous structure of the second zeolitic material obtained in (2). To this effect, and in particular in instances in which the one or more structure directing agents comprise one or more organotemplates which may be burned out of the second zeolitic material obtained in (2), it is preferred that the inventive process further comprises (3) calcining the second zeolitic material obtained in (2).

In addition to or alternatively to the preferred step of calcining in (3), it is further preferred that the inventive process further comprises (4) subjecting the zeolitic material obtained in (2) or (3) to an ion-exchange procedure.

As regards the preferred ion-exchange procedure, no particular restrictions apply with regard to the ions which are exchanged into the second zeolitic material, preferably after calcination thereof in (3). Thus, according to the inventive process, the second zeolitic material obtained in (2) or (3) can optionally be subject to at least one step of an ion-exchange procedure, wherein the term "ion-exchange" according to the present invention generally refers to ionic extra-framework ionic elements and/or molecules contained in the optionally calcined second zeolitic material which are accordingly exchanged by other ions, which are generally provided from an external source. Preferably, the one or more ionic extra-framework elements preferably comprise H⁺ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, more preferably Na.

In general, any conceivable ion-exchange procedure with all possible ionic elements and/or molecules can be conducted on the zeolitic material obtained in (2) or (3). Preferably, as ionic elements at least one cation and/or cationic element is employed which is preferably selected from the group consisting of H⁺, NH$_4$⁺, Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of H⁺, NH$_4$⁺, Sr, Cr, Mo, Fe, Co, Ni, Cu, Zn, Ag, and mixtures of two or more thereof, more preferably from the group consisting of H⁺, NH$_4$⁺, Cr, Mg, Mo, Fe, Ni, Cu, Zn, Ag, and mixtures of two or more thereof. According to particularly preferred embodiments of the present invention, the one or more cations and/or cationic elements are selected from the group consisting of Mg, Mo, Fe, Ni, Cu, Zn, Ag, and mixtures of two or more thereof, wherein more preferably the one or more cation and/or cationic elements comprise Cu and/or Fe, preferably Cu, wherein even more preferably the one or more cation and/or cationic elements consist of Cu and/or Fe, preferably of Cu. Preferably, the zeolitic material obtained in (2) or (3) is first ion-exchanged with $H^+$ and/or $NH_4^+$, and more preferably with $NH_4^+$, before being subject to a further ion-exchange procedure, more preferably before being subject to ion-exchange with at least one cation and/or cationic element selected from the group consisting of Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of Sr, Cr, Mo, Fe, Co, Ni, Cu, Zn, Ag, and mixtures of two or more thereof, more preferably from the group consisting of Cr, Mg, Mo, Fe, Ni, Cu, Zn, Ag, and mixtures of two or more thereof, more preferably from the group consisting of Mg, Mo, Fe, Ni, Cu, Zn, Ag, and mixtures of two or more thereof, wherein more preferably the zeolitic material obtained in (2) or (3) is first ion-exchanged with $H^+$ and/or $NH_4^+$, and more preferably with $NH_4^+$, before being subject to a further ion-exchange procedure with one or more cation and/or cationic elements comprising Cu and/or Fe, preferably Cu, wherein more preferably the one or more cation and/or cationic elements consist of Cu and/or Fe, preferably of Cu.

Furthermore, the inventive process preferably further comprises (5) calcining the zeolitic material obtained in (4).

As regards the temperature of calcination in further steps (3) and/or (5) which the inventive process may comprise, again, no particular restrictions apply such that the temperature at which calcination in either or both of said steps may be conducted may be in the range of anywhere from 300 to 900° C., and is preferably in the range of from 400 to 700° C., and more preferably of from 450 to 650° C. According to the present invention, it is particularly preferred that the temperature of calcination in further steps (3) and/or (5) is in the range of from 500 to 600° C.

Same applies accordingly relative to the duration of the preferred calcination in either or both of steps (3) and/or (5), such that by way of example calcining in (3) and/or (5) may be conducted for a period in the range of anywhere from 0.5 to 10 h, wherein preferably calcining is conducted in (3) and/or (5) for a duration in the range of from 1 to 15 h, more preferably from 2 to 12 h, more preferably from 2.5 to 9 h, more preferably from 3 to 7 h, more preferably from 3.5 to 6.5 h, more preferably from 4 to 6 h, and more preferably from 4.5 to 5.5 h. According to the inventive process, it is particularly preferred that calcination in either or both of steps (3) and/or (5) is conducted for a period of from 3 to 12 h.

As regards the seed crystals which are contained in the mixture provided in (1) and heated in (2), no particular restrictions apply provided that a second zeolitic material having a different type of framework structure than the first zeolitic material is obtained in (2). According to the present invention, it is preferred that the seed crystals comprise a zeolitic material having a different type of framework structure than the first zeolitic material, wherein more preferably the seed crystals comprise a zeolitic material having the same structure type a the second zeolitic material obtained in (2). Thus, according to the inventive process, it is particularly preferred that the seed crystals comprise a zeolitic material having a CHA-type and/or an AEI-type framework structure, wherein more preferably the zeolitic material of the seed crystals is preferably obtainable and/or obtained according to any of the particular and preferred embodiments of the inventive process as defined in the present application.

As regards the preferred seed crystals comprised in the mixture obtained in (1) which have a CHA-type framework structure, it is further preferred that the zeolitic material having a CHA-type framework structure comprised in the seed crystals is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li-Na| [Al—Si—O]-CHA, (Ni(deta)2)-UT-6, SSZ-13, and SSZ-62, including mixtures of two or more thereof, preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof, more preferably from the group consisting of Chabazite, Linde D, Linde R, SAPO-34, SSZ-13, and SSZ-62, including mixtures of two or more thereof, and more preferably from the group consisting of Chabazite, SSZ-13, and SSZ-62, including mixtures of two or three thereof. According to the present invention it is particularly preferred that the zeolitic material having a CHA-type framework structure preferably comprised in the seed crystals is chabazite and/or SSZ-13, preferably SSZ-13.

Furthermore, as regards the preferred seed crystals comprised in the mixture obtained in (1) which have an AEI-type framework structure, it is further preferred that the zeolitic material having an AEI-type framework structure comprised in the seed crystals is selected from the group consisting of SSZ-39, SAPO-18, SIZ-8, including mixtures of two or more thereof. According to the present invention it is particularly preferred that the zeolitic material having a CHA-type framework structure preferably comprised in the seed crystals is SSZ-39.

As regards the amount of seed crystals which may be comprised in the mixture obtained in (1), no particular restrictions apply provided that a second zeolitic material having a different type of framework structure than the first zeolitic material is obtained in (2). Thus, by way of example, the amount of seed crystals contained in the mixture prepared in (1) and heated in (2) may range anywhere from 0.1 to 15 wt.-% based on 100 wt.-% of $YO_2$ in the framework structure of the first zeolitic material, wherein preferably the amount of seed crystals contained in the mixture prepared in (1) ranges from 0.5 to 12 wt.-%, more preferably from 1 to 10 wt.-%, more preferably from 1.5 to 9 wt.-%, more preferably from 2 to 8 wt.-%, more preferably from 2.5 to 7.5 wt.-%, more preferably from 3 to 7 wt.-%, more preferably from 3.5 to 6.5 wt.-%, more preferably from 4 to 6 wt.-%, and more preferably from 4.5 to 5.5 wt.-% based on 100 wt.-% of $YO_2$ in the framework structure of the first zeolitic material.

According to the present invention, no particular restriction applies as to how the components are added to one another in (1) for obtaining a mixture. It is, however, preferred that the components are homogenized in (1), preferably by mixing, wherein it is further preferred that the particle size of the individual components is homogenized for example by a milling procedure. Thus, according o the inventive process, it is particularly preferred that (1) further includes a step of milling the mixture.

Besides relating to a process as defined by the particular and preferred embodiments in the foregoing in addition to the specific examples of the experimental section below, the present invention further relates to a zeolitic material obtainable and/or obtained according to any of these particular and preferred embodiments of the inventive process as defined in the present application.

Thus, as regards the framework structure type of the inventive zeolitic material, no particular restrictions apply provided that it has a different type of framework structure than the first zeolitic material with which it is obtainable and/or obtained, and in particular provided that the inventive zeolitic material has a different type of framework structure that the FAU-, GIS-, MOR-, and LTA-type framework structures, preferably than the FAU-type and/or a GIS-type framework structures, and more preferably than the FAU-type framework structure. In particular, it is preferred according to the present invention that the inventive zeolitic material has a CHA-type framework structure, wherein more preferably the zeolitic material having a CHA-type framework structure is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li-Na| [A-Si—O]-CHA, (Ni(deta)2)-UT-6, SSZ-13, and SSZ-62, including mixtures of two or more thereof, as respectively obtainable and/or obtained according to any of the particular and preferred embodiments of the inventive process as defined in the present application, and more preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof, more preferably from the group consisting of Chabazite, Linde D, Linde R, SAPO-34, SSZ-13, and SSZ-62, including mixtures of two or more thereof, and more preferably from the group consisting of Chabazite, SSZ-13, and SSZ-62, including mixtures of two or three thereof. According to the present invention it is, however, particularly preferred that the inventive zeolitic material having a CHA-type framework structure comprises chabazite and/or SSZ-13, preferably SSZ-13, wherein more preferably the inventive zeolitic material is chabazite and/or SSZ-13, preferably SSZ-13, as respectively obtainable and/or obtained according to any of the particular and preferred embodiments of the inventive process as defined in the present application.

According to the present invention it is alternatively particularly preferred that the inventive zeolitic material has an AEI-type framework structure, wherein more preferably the zeolitic material having an AEI-type framework structure is selected from the group consisting of SSZ-39, SAPO-18, SIZ-8, including mixtures of two or more thereof, as respectively obtainable and/or obtained according to any of the particular and preferred embodiments of the inventive process as defined in the present application. According to the present invention it is, however, alternatively particularly preferred that the inventive zeolitic material having an AEI-type framework structure comprises SSZ-39, wherein more preferably the zeolitic material is SSZ-39 as obtainable and/or obtained according to any of the particular and preferred embodiments of the inventive process as defined in the present application.

Finally, the present invention also relates to the use o a zeolitic material according to any of the particular and preferred embodiments of the zeolitic material as defined in the present application. In general, no restriction whatsoever applies to the applications in which the inventive zeolitic material may be employed. It is, however, preferred according to the present invention that the inventive zeolitic material is used as a molecular sieve, as an adsorbent, for ion-exchange, or as a catalyst and/or as a catalyst support. According to the preferred use of the present invention wherein the inventive zeolitic material is employed as a catalyst, again, no restrictions whatsoever apply as to the number and/or type of catalytic reaction in which it may be employed. It is, however, preferred according to the present invention that the inventive catalyst is used as a catalyst for the selective catalytic reduction (SCR) of nitrogen oxides $NO_x$; for the storage and/or adsorption of $CO_2$; for the oxidation of $NH_3$, and in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_x$, and more preferably for the selective catalytic reduction (SCR) of nitrogen oxides $NO_x$ in exhaust gas from a combustion engine, preferably from a diesel engine or from a lean burn gasoline engine.

The present invention is further illustrated by the following embodiments and combinations of embodiments as indicated by the respective dependencies and back-references. In particular, it is noted that in each instance where a combination of embodiments is mentioned as a range, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4". Thus, the present invention includes the following embodiments, wherein these include the specific combinations of embodiments as indicated by the respective interdependencies defined therein:

1. A process for the preparation of a zeolitic material comprising $YO_2$ and $X_2O_3$ in its framework structure, wherein Y stands for a tetravalent element and X stands for a trivalent element, wherein said process comprises:
   (1) preparing a mixture comprising one or more structure directing agents, seed crystals, and a first zeolitic material comprising $YO_2$ and $X_2O_3$ in its framework structure, wherein the first zeolitic material has a framework structure selected from the group consisting of FAU-, GIS-, MOR-, and LTA-type framework structures, including mixtures of two or more thereof, wherein preferably the first zeolitic material has an FAU-type and/or a GIS-type framework structure, wherein more preferably the first zeolitic material has an FAU-type framework structure;
   (2) heating the mixture obtained in (1) for obtaining a second zeolitic material comprising $YO_2$ and $X_2O_3$ in its framework structure, wherein the second zeolitic material obtained in (2) has a different type of framework structure than the first zeolitic material contained in the mixture obtained in (1);
   wherein the mixture prepared in (1) and heated in (2) contains 1000 wt.-% or less of $H_2O$ based on 100 wt.-% of $YO_2$ in the framework structure of the first zeolitic material, preferably 1 to 800 wt.-%, more preferably 5 to 150 wt.-%, more preferably 10 to 600 wt.-%, more preferably 20 to 500 wt.-%, more preferably 30 to 400 wt.-%, more preferably 40 to 300 wt.-%, more preferably 50 to 250 wt.-%, more preferably 60 to 200 wt.-%, more preferably 65 to 170 wt.-%, more preferably 70 to 150 wt.-%, more preferably 75 to 140 wt.-%, more preferably 80 to 130 wt.-%, more preferably 85 to 120 wt.-%, and more preferably 90 to 110 wt.-% based on 100 wt.-% of $YO_2$ contained in the framework structure of the first zeolitic material.
2. The process of embodiment 1, wherein the first zeolitic material having an FAU-type framework structure is selected from the group consisting of ZSM-3, Faujasite, [Al—Ge—O]-FAU, CSZ-1, ECR-30, Zeolite X, Zeolite Y, LZ-210, SAPO-37, ZSM-20, Na—X, US-Y, Na—Y, [Ga—Ge—O]-FAU, Li-LSX, [Ga—Al—Si—O]-FAU, and [Ga—Si—O]-FAU, including mixtures of two or more thereof, preferably from the group consisting of ZSM-3, Faujasite, CSZ-1, ECR-30, Zeolite X, Zeolite Y, LZ-210, ZSM-20, Na—X, US-Y, Na—Y, and Li-LSX, including mixtures of two or more thereof, more preferably from the group consisting of Faujasite, Zeolite X, Zeolite Y, Na—X, US-Y, and Na—Y, including mixtures of two or more thereof, more preferably from the group consisting of Faujasite, Zeolite X, and Zeolite Y, including mixtures of two or more thereof, wherein more preferably the first zeolitic material having an FAU-type framework structure comprises zeolite X and/or zeolite Y, preferably zeolite Y, wherein more preferably the first zeolitic material having an FAU-type framework structure is zeolite X and/or zeolite Y, preferably zeolite Y.

3. The process of embodiment 1 or 2, wherein the first zeolitic material having a GIS-type framework structure is selected from the group consisting of zeolite P, TMA-gismondine, Na—P1, Amicite, Gobbinsite, High-silica Na—P, Na—P2, SAPO-43, Gismondine, MAPSO-43, MAPSO-43, Garronite, Synthetic amicite, Synthetic garronite, Synthetic gobbinsite, [Ga—Si—O]-GIS, Synthetic Ca-garronite, Low-silica Na—P (MAP), [Al—Ge—O]-GIS, including mixtures of two or more thereof, preferably from the group consisting of zeolite P, TMA-gismondine, Na—P1, Amicite, Gobbinsite, High-silica Na—P, Na—P2, Gismondine, Garronite, Synthetic amicite, Synthetic garronite, Synthetic gobbinsite, [Ga—Si—O]-GIS, Synthetic Ca-garronite, [Al—Ge—O]-GIS, including mixtures of two or more thereof, more preferably from the group consisting of zeolite P, TMA-gismondine, Na—P1, Amicite, Gobbinsite, High-silica Na—P, Na—P2, Gismondine, Garronite, Synthetic amicite, Synthetic garronite, Synthetic gobbinsite, Synthetic Ca-garronite, including mixtures of two or more thereof, more preferably from the group consisting of zeolite P, Na—P1, High-silica Na—P, Na—P2, including mixtures of two or more thereof, wherein more preferably the first zeolitic material having a GIS-type framework structure comprises zeolite P, wherein more preferably the first zeolitic material having a GIS-type framework structure is zeolite P.

4. The process of any of embodiments 1 to 3, wherein the first zeolitic material having an MOR-type framework structure is selected from the group consisting of Mordenite, [Ga—Si—O]-MOR, Maricopaite, Ca-Q, LZ-211, Na-D, RMA-1, including mixtures of two or more thereof, wherein preferably the first zeolitic material having an MOR-type framework structure comprises Mordenite, wherein more preferably the first zeolitic material having an MOR-type framework structure is Mordenite.

5. The process of any of embodiments 1 to 4, wherein the first zeolitic material having an LTA-type framework structure is selected from the group consisting of Linde Type A (zeolite A), Alpha, [Al—Ge—O]-LTA, N-A, LZ-215, SAPO-42, ZK-4, ZK-21, Dehyd. Linde Type A (dehyd. zeolite A), ZK-22, ITQ-29, UZM-9, including mixtures of two or more thereof, preferably from the group consisting of Linde Type A, Alpha, N-A, LZ-215, SAPO-42, ZK-4, ZK-21, Dehyd. Linde Type A, ZK-22, ITQ-29, UZM-9, including mixtures of two or more thereof, more preferably from the group consisting of Linde Type A, Alpha, N-A, LZ-215, ZK-4, ZK-21, Dehyd. Linde Type A, ZK-22, ITQ-29, UZM-9, including mixtures of two or more thereof, more preferably from the group consisting of Linde Type A, Alpha, N-A, LZ-215, ZK-4, ZK-21, ZK-22, ITQ-29, UZM-9, including mixtures of two or more thereof.

6. The process of any of embodiments 1 to 5, wherein the second zeolitic material obtained in (2) has a CHA-type framework structure, wherein preferably the zeolitic material having a CHA-type framework structure is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li-Na| [A-Si—O]-CHA, (Ni(deta)2)-UT-6, SSZ-13, and SSZ-62, including mixtures of two or more thereof, more preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof, more preferably from the group consisting of Chabazite, Linde D, Linde R, SAPO-34, SSZ-13, and SSZ-62, including mixtures of two or more thereof, more preferably from the group consisting of Chabazite, SSZ-13, and SSZ-62, including mixtures of two or three thereof, wherein more preferably the second zeolitic material obtained in (2) comprises chabazite and/or SSZ-13, preferably SSZ-13, and wherein more preferably the second zeolitic material obtained in (2) is chabazite and/or SSZ-13, preferably SSZ-13.

7. The process of any of embodiments 1 to 6, wherein the one or more structure directing agents comprises one or more tetraalkylammonium cation $R^1R^2R^3R^4N^+$-containing compounds, wherein $R^1$, $R^2$, and $R^3$ independently from one another stand for alkyl, and wherein $R^4$ stands for cycloalkyl.

8. The process of embodiment 7, wherein $R^1$ and $R^2$ independently from one another stand for optionally substituted and/or optionally branched $(C_1-C_6)$alkyl, preferably $(C_1-C_5)$alkyl, more preferably $(C_1-C_4)$alkyl, more preferably $(C_1-C_3)$alkyl, and more preferably for optionally substituted methyl or ethyl, wherein more preferably $R^1$ and $R^2$ independently from one another stand for optionally substituted methyl or ethyl, preferably unsubstituted methyl or ethyl, wherein more preferably $R^1$ and $R^2$ independently from one another stand for optionally substituted methyl, preferably unsubstituted methyl.

[methyl]

9. The process of embodiment 7 or 8, wherein $R^3$ stands for optionally substituted and/or optionally branched $(C_1-C_6)$ alkyl, preferably $(C_1-C_5)$alkyl, more preferably $(C_1-C_4)$ alkyl, more preferably $(C_1-C_3)$alkyl, and more preferably for optionally substituted methyl or ethyl, wherein more preferably $R^3$ stands for optionally substituted ethyl, preferably unsubstituted ethyl.

10. The process of any of embodiments 7 to 9, wherein $R^4$ stands for optionally heterocyclic and/or optionally substituted 5- to 8-membered cycloalkyl, preferably for 5- to 7-membered cycloalkyl, more preferably for 5- or 6-membered cycloalkyl, wherein more preferably $R^4$ stands for optionally heterocyclic and/or optionally substituted 6-membered cycloalkyl, preferably optionally substituted cyclohexyl, and more preferably unsubstituted cyclohexyl.

11. The process of any of embodiments 7 to 10, wherein the one or more tetraalkylammonium cation $R^1R^2R^3R^4N^+$-containing compounds comprise one or more N,N,N-tri($C_1$-$C_4$)alkyl($C_5$-$C_7$)cycloalkylammonium compounds, preferably one or more N,N,N-tri($C_1$-$C_3$)alkyl-($C_5$-$C_6$)cycloalkylammonium compounds, more preferably one or more N,N,N-tri($C_1$-$C_2$)alkyl($C_5$-$C_6$)cycloalkylammonium compounds, more preferably one or more N,N,N-tri($C_1$-$C_2$)alkyl-cyclopentylammonium and/or one or more N,N,N-tri($C_1$-$C_2$)alkyl-cyclohexylammonium compounds, more preferably one or more compounds selected from N,N,N-triethyl-cyclohexylammonium, N,N-diethyl-N-methyl-cyclohexylammonium, N,N-dimethyl-N-ethyl-cyclohexylammonium, N,N,N-trimethyl-cyclohexylammonium compounds, and mixtures of two or more thereof, wherein more preferably the one or more tetraalkylammonium cation $R^1R^2R^3R^4N^+$-containing compounds comprise one or more N,N-dimethyl-N-ethyl-cyclohexylammonium compounds.

12. The process of any of embodiments 7 to 11, wherein the one or more tetraalkylammonium cation $R^1R^2R^3R^4N^+$-containing compounds are salts, preferably one or more salts selected from the group consisting of halides, sulfate, nitrate, phosphate, acetate, and mixtures of two or more thereof, more preferably from the group consisting of bromide, chloride, hydroxide, sulfate, and mixtures of two or more thereof, wherein more preferably the one or more tetraalkylammonium cation $R^1R^2R^3R^4N$-containing compounds are tetraalkylammonium hydroxides and/or bromides, and more preferably tetraalkylammonium bromides.

13. The process of any of embodiments 1 to 12, wherein the one or more structure directing agents comprises one or more tetraalkylammonium cation $R^1R^2R^3R^4N^+$-containing compounds, wherein $R^1$, $R^2$, and $R^3$ independently from one another stand for alkyl, and wherein $R^4$ stands for adamantyl and/or benzyl, preferably for 1-adamantyl.

14. The process of embodiment 13, wherein $R^1$, $R^2$, and $R^3$ independently from one another stand for optionally substituted and/or optionally branched ($C_1$-$C_6$)alkyl, preferably ($C_1$-$C_5$)alkyl, more preferably ($C_1$-$C_4$)alkyl, more preferably ($C_1$-$C_3$)alkyl, and more preferably for optionally substituted methyl or ethyl, wherein more preferably $R^1$, $R^2$, and $R^3$ independently from one another stand for optionally substituted methyl or ethyl, preferably unsubstituted methyl or ethyl, wherein more preferably $R^1$, $R^2$, and $R^3$ independently from one another stand for optionally substituted methyl, preferably unsubstituted methyl.

15. The process of embodiment 13 or 14, wherein $R^4$ stands for optionally heterocyclic and/or optionally substituted adamantyl and/or benzyl, preferably for optionally heterocyclic and/or optionally substituted 1-adamantyl, preferably for optionally substituted adamantyl and/or benzyl, more preferably for optionally substituted 1-adamantyl, more preferably for unsubstituted adamantyl and/or benzyl, and more preferably for unsubstituted 1-adamantyl.

16. The process of any of embodiments 13 to 15, wherein the one or more tetraalkylammonium cation $R^1R^2R^3R^4N^+$-containing compounds comprise one or more N,N,N-tri($C_1$-$C_4$)alkyl-1-adamantammonium compounds, preferably one or more N,N,N-tri($C_1$-$C_3$)alkyl-1-adamantammonium compounds, more preferably one or more N,N,N-tri($C_1$-$C_2$)alkyl-1-adamantammonium compounds, more preferably one or more N,N,N-tri($C_1$-$C_2$) alkyl-1-adamantammonium and/or one or more N,N,N-tri($C_1$-$C_2$)alkyl-1-adamantammonium compounds, more preferably one or more compounds selected from N,N,N-triethyl-1-adamantammonium, N,N-diethyl-N-methyl-1-adamantammonium, N,N-dimethyl-N-ethyl-1-adamantammonium, N,N,N-trimethyl-1-adamantammonium compounds, and mixtures of two or more thereof, wherein more preferably the one or more tetraalkylammonium cation $R^1R^2R^3R^4N^+$-containing compounds comprise one or more N,N,N-trimethyl-1-adamantammonium compounds.

17. The process of any of embodiments 13 to 16, wherein the one or more tetraalkylammonium cation $R^1R^2R^3R^4N^+$-containing compounds are salts, preferably one or more salts selected from the group consisting of halides, sulfate, nitrate, phosphate, acetate, and mixtures of two or more thereof, more preferably from the group consisting of bromide, chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or bromides, and more preferably tetraalkylammonium hydroxides.

18. The process of any of embodiments 1 to 5, wherein the second zeolitic material obtained in (2) has an AEI-type framework structure, wherein preferably the zeolitic material having an AEI-type framework structure is selected from the group consisting of SSZ-39, SAPO-18, SIZ-8, including mixtures of two or more thereof, wherein more preferably the second zeolitic material obtained in (2) comprises SSZ-39, and wherein more preferably the second zeolitic material obtained in (2) is SSZ-39.

19. The process of any of embodiments 1 to 18, wherein the one or more structure directing agents comprises one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain.

20. The process of embodiment 19, wherein $R^1$ and $R^2$ independently from one another stand for optionally substituted and/or optionally branched ($C_1$-$C_6$)alkyl, preferably ($C_1$-$C_5$)alkyl, more preferably ($C_1$-$C_4$)alkyl, more preferably ($C_1$-$C_3$)alkyl, and more preferably for optionally substituted methyl or ethyl, wherein more preferably $R^1$ and $R^2$ independently from one another stand for optionally substituted methyl or ethyl, preferably unsubstituted methyl or ethyl, wherein more preferably $R^1$ and $R^2$ independently from one another stand for optionally substituted methyl, preferably unsubstituted methyl.

21. The process of embodiment 19 or 20, wherein $R^3$ and $R^4$ form a common derivatized or underivatized, preferably underivatized alkyl chain, preferably a common ($C_4$-$C_8$) alkyl chain, more preferably a common ($C_4$-$C_7$)alkyl chain, more preferably a common ($C_4$-$C_6$)alkyl chain, wherein more preferably said common alkyl chain is a derivatized or underivatized, preferably underivatized $C_4$ or $C_5$ alkyl chain, and more preferably a derivatized or underivatized, preferably underivatized $C_5$ alkyl chain.

22. The process of any of embodiments 19 to 21, wherein the one or more tetraalkylammonium cation $R^1R^2R^3R^4N^+$-containing compounds comprise one or more ammonium compounds selected from the group consisting of derivatized or underivatized, preferably underivatized N,N-di($C_1$-$C_4$)alkyl-2,6-di($C_1$-$C_4$)alkylpyrrolidinium compounds, N,N-di($C_1$-$C_4$)alkyl-2,6-di($C_1$-$C_4$)

alkylpiperidinium compounds, N,N-di($C_1$-$C_4$)alkyl-2,6-di($C_1$-$C_4$)alkylhexahydroazepinium compounds, and mixtures of two or more thereof, preferably from the group consisting of N,N-di($C_1$-$C_4$)alkyl-2,6-di($C_1$-$C_4$)alkylpyrrolidinium compounds, N,N-di($C_1$-$C_4$)alkyl-2,6-di ($C_1$-$C_4$)alkylpiperidinium compounds, N,N-di($C_1$-$C_4$)alkyl-2,6-di($C_1$-$C_4$)alkylhexahydroazepinium compounds, and mixtures of two or more thereof, more preferably from the group consisting of N,N-di($C_1$-$C_3$)alkyl-2,6-di($C_1$-$C_3$)alkylpyrrolidinium compounds, N,N-di($C_1$-$C_3$)alkyl-2,6-di($C_1$-$C_3$)alkylpiperidinium compounds, N,N-di($C_1$-$C_3$)alkyl-2,6-di($C_1$-$C_3$)alkylhexahydroazepinium compounds, and mixtures of two or more thereof, more preferably from the group consisting of N,N-di($C_1$-$C_2$)alkyl-2,6-di($C_1$-$C_2$)alkylpyrrolidinium compounds, N,N-di($C_1$-$C_2$)alkyl-2,6-di($C_1$-$C_2$)alkylpiperidinium compounds, N,N-di($C_1$-$C_2$)alkyl-2,6-di($C_1$-$C_2$)alkylhexahydroazepinium compounds, and mixtures of two or more thereof, more preferably from the group consisting of N,N-di($C_1$-$C_2$)alkyl-2,6-di($C_1$-$C_2$)alkylpiperidinium compounds, and mixtures of two or more thereof, wherein more preferably the one or more tetraalkylammonium cation $R^1R^2R^3R^4N^+$-containing compounds comprise one or more N,N-dimethyl-2,6-dimethylpiperidinium compounds.

23. The process of any of embodiments 19 to 22, wherein the one or more tetraalkylammonium cation $R^1R^2R^3R^4N^+$-containing compounds are salts, preferably one or more salts selected from the group consisting of halides, sulfate, nitrate, phosphate, acetate, and mixtures of two or more thereof, more preferably from the group consisting of bromide, chloride, hydroxide, sulfate, and mixtures of two or more thereof, wherein more preferably the one or more tetraalkylammonium cation $R^1R^2R^3R^4N^+$-containing compounds are tetraalkylammonium hydroxides and/or bromides, and more preferably tetraalkylammonium hydroxides.

24. The process of any of embodiments 1 to 23, wherein Y is selected from the group consisting of Si, Sn, Ti, Zr, Ge, and mixtures of two or more thereof, Y preferably being Si.

25. The process of any of embodiments 1 to 24, wherein X is selected from the group consisting of Al, B, In, Ga, and mixtures of two or more thereof, X preferably being Al and/or B, and more preferably being Al.

26. The process of any of embodiments 1 to 25, wherein independently from one another, the framework structure of the first zeolitic material displays a $YO_2$: $X_2O_3$ molar ratio ranging from 5 to 120, preferably from 8 to 80, more preferably from 10 to 50, more preferably from 13 to 40, more preferably from 15 to 30, more preferably from 18 to 25, and more preferably from 20 to 23.

27. The process of any of embodiments 5 to 26, wherein the mixture prepared in (1) and heated in (2) displays an $R^1R^2R^3R^4N^+$: $YO_2$ molar ratio of the one or more tetraalkylammonium cations to $YO_2$ in the framework structure of the first zeolitic material is in the range of from 0.03 to 0.5, preferably of from 0.05 to 0.4, more preferably of from 0.08 to 0.3, more preferably of from 0.1 to 0.28, more preferably of from 0.12 to 0.26, more preferably of from 0.14 to 0.24, more preferably of from 0.16 to 0.22, and more preferably of from 0.18 to 0.2.

28. The process of any of embodiments 1 to 27, wherein the mixture prepared in (1) and heated in (2) further comprises at least one source for OH, wherein said at least one source for OH preferably comprises a metal hydroxide, more preferably a hydroxide of an alkali metal M, more preferably sodium and/or potassium hydroxide, and more preferably sodium hydroxide, wherein more preferably the at least one source for OH is sodium hydroxide.

29. The process of embodiment 28, wherein the mixture prepared in (1) and heated in (2) displays an $OH^-$: $YO_2$ molar ratio in the range of from 0.01 to 0.5, preferably from 0.05 to 0.3, more preferably from 0.08 to 0.25, more preferably from 0.1 to 0.23, more preferably from 0.12 to 0.21, more preferably from 0.13 to 0.19, and more preferably from 0.15 to 0.17.

30. The process of embodiment 28, wherein the mixture prepared in (1) and heated in (2) displays an $OH^-$: $YO_2$ molar ratio in the range of from 0.05 to 2, preferably from 0.1 to 1.7, more preferably from 0.3 to 1.5, more preferably from 0.5 to 1.3, more preferably from 0.7 to 1.2, more preferably from 0.8 to 1.1, more preferably from 0.85 to 1, and more preferably from 0.9 to 0.95.

31. The process of any of embodiments 1 to 30, wherein the heating in (2) is conducted at a temperature ranging from 80 to 250° C., preferably from 90 to 230° C., more preferably from 100 to 210° C., more preferably from 110 to 200° C., more preferably from 115 to 190° C., more preferably from 120 to 180° C., more preferably from 125 to 170° C., more preferably from 130 to 160° C., more preferably from 135 to 155° C., and more preferably from 140 to 150° C.

32. The process of embodiment 31, wherein the heating in (2) is conducted for a period in the range of from 3 h to 12 d, preferably from 6 h to 10 d, more preferably from 12 h to 8 d, more preferably from 18 h to 6 d, more preferably from 1 to 5.5 d, more preferably from 1.5 to 5 d, more preferably from 2 to 4.5 d, and more preferably from 2.5 to 3.5 d.

33. The process of any of embodiments 1 to 30, wherein the heating in (2) is conducted at a temperature ranging from 170 to 300° C., preferably from 180 to 290° C., more preferably from 190 to 280° C., more preferably from 200 to 275° C., more preferably from 210 to 270° C., more preferably from 215 to 265° C., more preferably from 220 to 260° C., more preferably from 225 to 255° C., more preferably from 230 to 250° C., and more preferably from 235 to 245° C.

34. The process of embodiment 33, wherein the heating in (2) is conducted for a period in the range of from 0.1 h to 6 h, preferably from 0.3 h to 4 h, more preferably from 0.5 h to 3 h, more preferably from 0.7 h to 2.5 h, more preferably from 0.8 h to 2 h, more preferably from 0.85 to 1.5 h, more preferably from 0.9 to 1.3 h, and more preferably from 0.95 to 1.1 h.

35. The process of any of embodiments 1 to 34, wherein the heating in (2) is conducted under autogenous pressure, wherein preferably heating in (2) is performed in a pressure tight vessel, preferably in an autoclave.

36. The process of any of embodiments 1 to 35, further comprising
   (3) calcining the second zeolitic material obtained in (2).

37. The process of any of embodiments 1 to 36, further comprising
   (4) subjecting the zeolitic material obtained in (2) or (3) to an ion-exchange procedure, wherein preferably one or more ionic extra-framework elements contained in the zeolite framework is ion-exchanged against $H^+$ and/or $NH_4$, more preferably against $NH_4$.

38. The process of embodiment 37, wherein in (4) one or more ionic extra-framework elements contained in the zeolite framework is ion-exchanged against one or more cations and/or cationic elements selected from the group consisting of Sr, Zr, Cr, Mg, Mo, Fe, Co, Ni, Cu, Zn, Ru, Rh, Pd, Ag, Os, Ir, Pt, Au, and mixtures of two or more thereof, more preferably from the group consisting of Sr, Cr, Mo, Fe, Co, Ni, Cu, Zn, Ag, and mixtures of two or more thereof, more preferably from the group consisting of Cr, Mg, Mo, Fe, Ni, Cu, Zn, Ag, and mixtures of two or more thereof, more preferably from the group consisting of Mg, Mo, Fe, Ni, Cu, Zn, Ag, and mixtures of two or more thereof, wherein more preferably the one or more cation and/or cationic elements comprise Cu and/or Fe, preferably Cu, wherein even more preferably the one or more cation and/or cationic elements consist of Cu and/or Fe, preferably of Cu;

wherein the one or more ionic extra-framework elements preferably comprise $H^+$ and/or an alkali metal, the alkali metal preferably being selected from the group consisting of Li, Na, K, Cs, and combinations of two or more thereof, more preferably from the group consisting of Li, Na, K, and combinations of two or more thereof, wherein more preferably the alkali metal is Na and/or K, more preferably Na.

39. The process of embodiment 37 or 38, further comprising (5) calcining the zeolitic material obtained in (4).

40. The process of any of embodiments 36 to 39, wherein the temperature of calcination in (3) and/or (5) is in the range of from 300 to 900° C., preferably of from 400 to 700° C., more preferably of from 450 to 650° C., and more preferably of from 500 to 600° C.

41. The process of any of embodiments 36 to 40, wherein calcining in (3) and/or (5) is conducted for a period in the range of from 0.5 to 10 h, preferably from 1 to 15 h, more preferably from 2 to 12 h, more preferably from 2.5 to 9 h, more preferably from 3 to 7 h, more preferably from 3.5 to 6.5 h, more preferably from 4 to 6 h, more preferably from 4.5 to 5.5 h, and more preferably from 3 to 12 h.

42. The process of any of embodiments 1 to 41, wherein the seed crystals comprise a zeolitic material having a CHA-type and/or an AEI-type framework structure, wherein preferably the zeolitic material of the seed crystals is obtainable and/or obtained according to any one of embodiments 1 to 41.

43. The process of embodiment 42, wherein the zeolitic material having a CHA-type framework structure comprised in the seed crystals is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li-Na| [Al—Si—O]-CHA, (Ni(deta)2)-UT-6, SSZ-13, and SSZ-62, including mixtures of two or more thereof, preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof, more preferably from the group consisting of Chabazite, Linde D, Linde R, SAPO-34, SSZ-13, and SSZ-62, including mixtures of two or more thereof, more preferably from the group consisting of Chabazite, SSZ-13, and SSZ-62, including mixtures of two or three thereof, wherein more preferably the zeolitic material having a CHA-type framework structure comprised in the seed crystals is chabazite and/or SSZ-13, preferably SSZ-13.

44. The process of embodiment 42 or 43, wherein the zeolitic material having an AEI-type framework structure comprised in the seed crystals is selected from the group consisting of SSZ-39, SAPO-18, SIZ-8, including mixtures of two or more thereof, wherein preferably the zeolitic material having an AEI-type framework structure comprised in the seed crystals is SSZ-39.

45. The process of any of embodiments 1 to 44, wherein the amount of seed crystals in the mixture prepared in (1) and heated in (2) ranges from 0.1 to 15 wt.-% based on 100 wt.-% of $YO_2$ in the framework structure of the first zeolitic material, preferably from 0.5 to 12 wt.-%, more preferably from 1 to 10 wt.-%, more preferably from 1.5 to 9 wt.-%, more preferably from 2 to 8 wt.-%, more preferably from 2.5 to 7.5 wt.-%, more preferably from 3 to 7 wt.-%, more preferably from 3.5 to 6.5 wt.-%, more preferably from 4 to 6 wt.-%, and more preferably from 4.5 to 5.5 wt.-% based on 100 wt.-% of $YO_2$ in the framework structure of the first zeolitic material.

46. The process of any of embodiments 1 to 45, wherein (1) includes a step of milling the mixture.

47. A zeolitic material obtainable and/or obtained according to the process of any of embodiments 1 to 46.

48. The zeolitic material of embodiment 47, wherein the zeolitic material has a CHA-type framework structure, wherein preferably the zeolitic material is selected from the group consisting of Willhendersonite, ZYT-6, SAPO-47, Na-Chabazite, Chabazite, LZ-218, Linde D, Linde R, SAPO-34, ZK-14, K-Chabazite, MeAPSO-47, Phi, DAF-5, UiO-21, |Li-Na| [Al—Si—O]-CHA, (Ni(deta)2)-UT-6, SSZ-13, and SSZ-62, including mixtures of two or more thereof, more preferably from the group consisting of ZYT-6, SAPO-47, Na-Chabazite, Chabazite, LZ-218, Linde D, Linde R, SAPO-34, ZK-14, K-Chabazite, Phi, DAF-5, UiO-21, SSZ-13, and SSZ-62, including mixtures of two or more thereof, more preferably from the group consisting of Chabazite, Linde D, Linde R, SAPO-34, SSZ-13, and SSZ-62, including mixtures of two or more thereof, more preferably from the group consisting of Chabazite, SSZ-13, and SSZ-62, including mixtures of two or three thereof, wherein more preferably the zeolitic material comprises chabazite and/or SSZ-13, preferably SSZ-13, and wherein more preferably the zeolitic material is chabazite and/or SSZ-13, preferably SSZ-13.

49. The zeolitic material of embodiment 47, wherein the zeolitic material has an AEI-type framework structure, wherein preferably the zeolitic material is selected from the group consisting of SSZ-39, SAPO-18, SIZ-8, including mixtures of two or more thereof, wherein more preferably the zeolitic material comprises SSZ-39, and wherein more preferably the zeolitic material is SSZ-39.

50. Use of a zeolitic material according to any of embodiments 47 to 49 as a molecular sieve, as an adsorbent, for ion-exchange, or as a catalyst and/or as a catalyst support, preferably as a catalyst for the selective catalytic reduction (SCR) of nitrogen oxides $NO_x$; for the storage and/or adsorption of $CO_2$; for the oxidation of $NH_3$, in particular for the oxidation of $NH_3$ slip in diesel systems; for the decomposition of $N_2O$; as an additive in fluid catalytic cracking (FCC) processes; and/or as a catalyst in organic conversion reactions, preferably in the conversion of alcohols to olefins, and more preferably in methanol to olefin (MTO) catalysis; more preferably for the selective catalytic reduction (SCR) of nitrogen oxides $NO_x$, and more preferably for the selective catalytic reduction (SCR) of nitrogen oxides $NO_x$ in exhaust gas from a combustion engine, preferably from a diesel engine or from a lean burn gasoline engine.

EXPERIMENTAL SECTION

Figure 1:
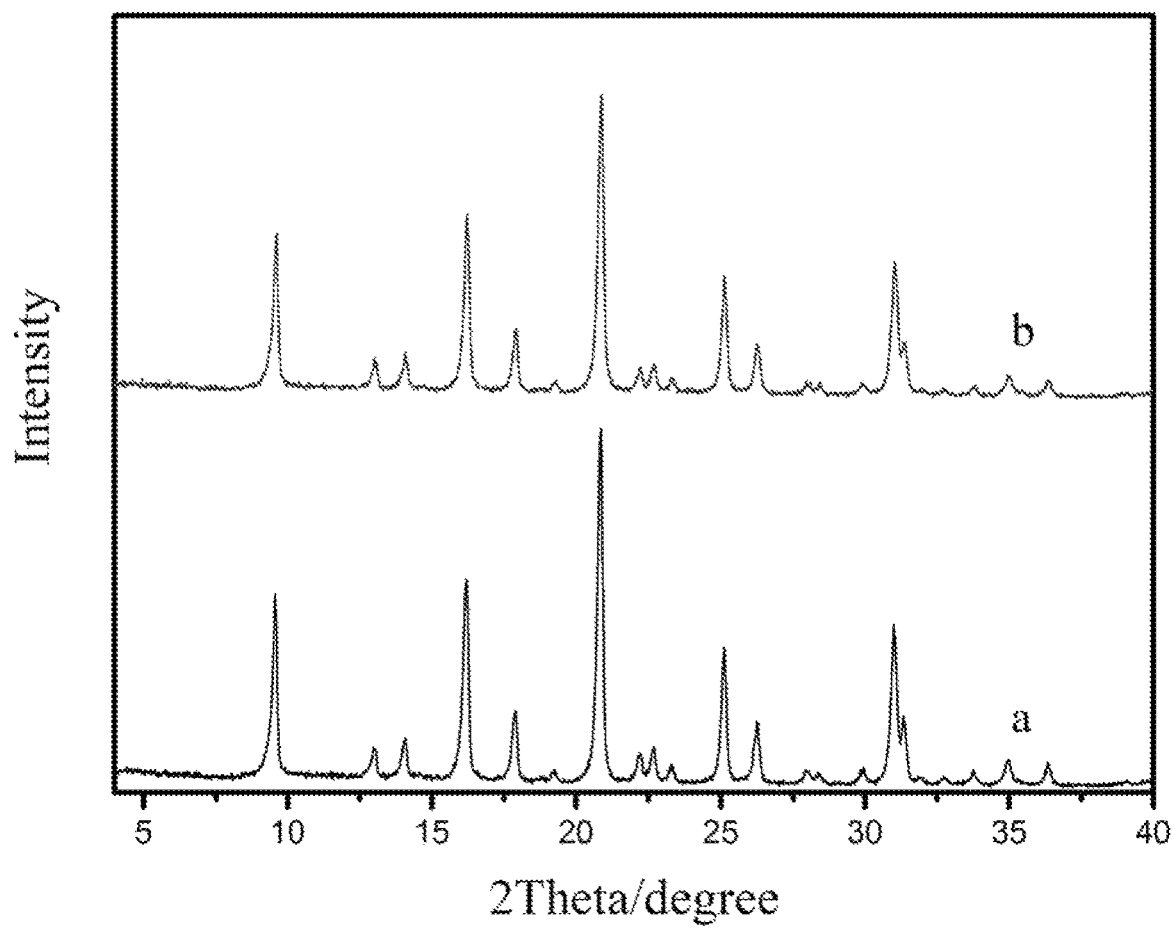
FIG. 1 shows the XRD patterns of the samples according to Example 1, designated as "a", and according to Example 2, designated as "b". In the figure, the angle 2 theta in 0 is shown along the abscissa and the intensities are separately plotted along the ordinate for each diffractogram.

The chemicals used in this work include ammonium nitrate ($NH_4NO_3$, AR, 99%, Beijing Chemical Reagent Co., Ltd.), N,N-dimethylcyclohexylamine (AR, 98%, Aladdin Chemistry Co., Ltd.), bromoethane (AR, 98%, Aladdin Chemistry Co., Ltd.), acetone (AR, 99.5%, Aladdin Chemistry Co., Ltd.), ethanol (AR, 99.7%, Shanghai Lingfeng Chemical Reagent Co, Ltd.), and N,N,N-trimethyl-1-1-adamantammonium hydroxide (TMAdaOH, 25%, Sichuan Zhongbang Co., Ltd.). FAU (Si/Al=11.6, H-FAU) and SSZ-13 (benchmark) were supplied by BASF SE. They were used directly without further processing unless otherwise stated.

The N,N-dimethyl-Aethyl-cyclohexylammonium bromide (DMCHABr) template compound employed in the examples was prepared as follows: 45 g of ethylbromide was added to a mixture of 50 g of N,N-dimethylcyclohexylamine and 100 g of ethanol. After reaction for overnight at 50° C., the product was finally obtained by washing with acetone and drying under vacuum condition.

The N,N-dimethyl-2,6-dimethylpiperridinium hydroxide template compound employed in the examples was prepared as follows: 30 g of 2,6-dimethylpiperidine was mixed with 150 ml of ethanol and 38 g of potassium carbonate. Then, 120 g of methyl iodide was added dropwise, keeping the reaction mixture under stirring for 3 days at room temperature. After reaction, the mixture was concentrated under vacuum and precipitated by addition of diethyl ether. The resultant solid was further extracted and washed with $CHCl_3$ to remove completely possible inorganic salts. The iodide salt was converted to the hydroxide salt by treatment with a hydroxide anion exchange resin. The hydroxide ion concentration is determined by titration of the resulting solution using phenolphthale as the indicator.

X-ray powder diffraction (XRD) patterns were measured with a Rigaku Ultimate VI X-ray diffractometer (40 kV, 40 mA) using CuKα ($\lambda$=1.5406 Å) radiation. The argon sorption isotherms at the temperature of liquid nitrogen were measured using Micromeritics ASAP 2020M and Tristar system. The sample composition was determined by inductively coupled plasma (ICP) with a Perkin-Elmer 3300DV emission spectrometer. Scanning electron microscopy (SEM) experiments were performed on Hitachi SU-1510 electron microscopes. $^{27}Al$ and $^{29}Si$ solid MAS NMR spectra were recorded on a Varian Infinity Plus 400 spectrometer.

Example 1: Preparation of a Zeolitic Material Having a CHA-Type Framework Structure (SSZ-13) at 150° C. Via Interzeolitic Transformation of Zeolite Y 2.4 g of zeolite Y (Si/Al=10.8) containing $H_2O$ (1.5 g of Y and 0.9 g $H_2O$), 0.75 g of DMECHABr, 0.12 g of NaOH and 0.028 g of uncalcined SSZ-13 zeolite seeds (2 wt.-%) were mixed together for affording a reaction mixture which contained 65 wt.-% of $H_2O$ based on 100 wt.-% of $SiO_2$ contained in the zeolite Y of the mixture. After grinding for 5-7 min, the powder mixture was transferred to an autoclave and sealed. After heating at 150° C. for 72 h, the sample was completely crystallized. The obtained sample was calcined at 550° C. for 5 hours to remove the template. The H-form of the sample was prepared by triple ion-exchange with 1 M $NH_4NO_3$ solution at 80° C. for 1 h and calcination at 550° C. for 5 h.

The reaction yield was 94%, and the resulting SSZ-13 displayed an Si to Al molar ratio of 10.4 as determined by ICP.

Figure 2:
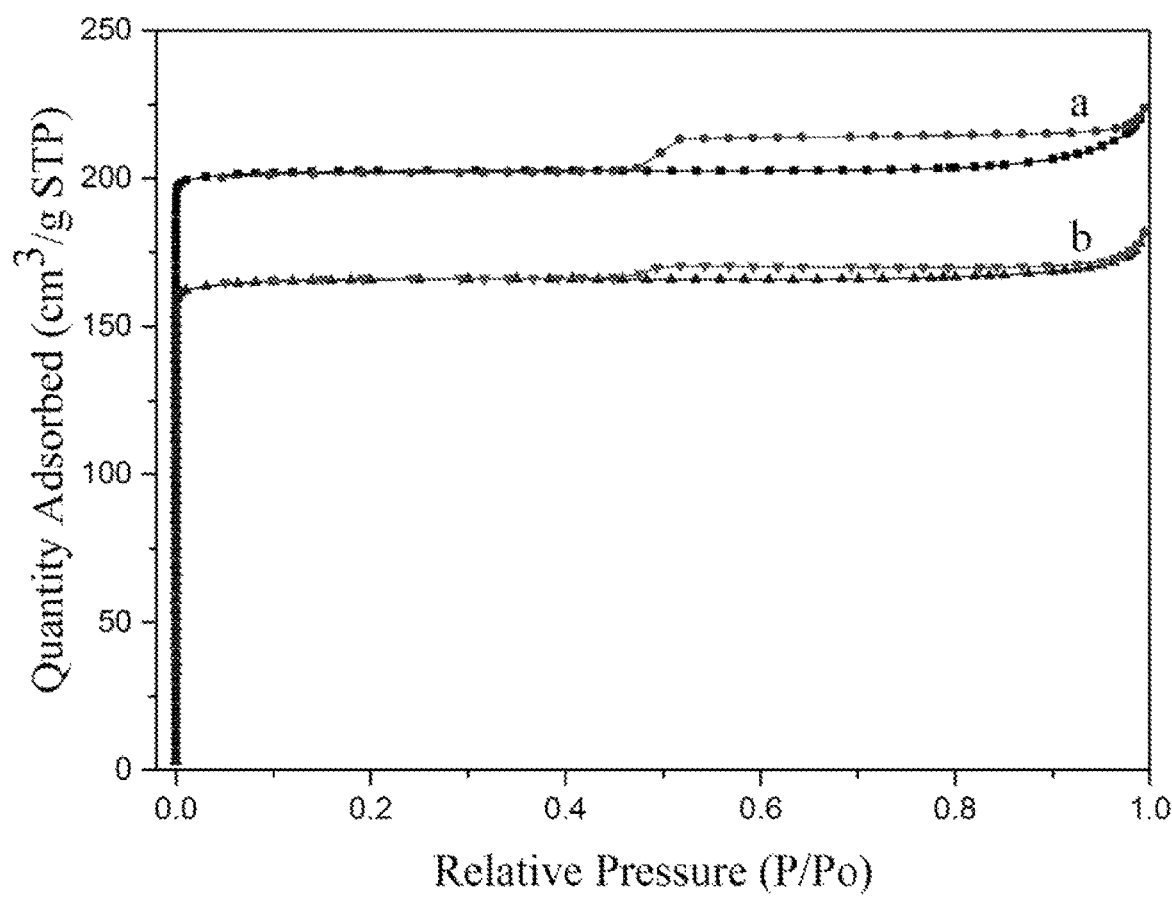
FIG. 2 shows the Ar sorption isotherms of the sample according to Example 1, designated as "a", and according to Example 2, designated as "b". In the figure, the relative pressure $P/P_0$ is plotted along the abscissa and the volume of argon (under standard temperature and pressure) adsorbed in $cm^3/g$.

FIG. 1 shows XRD pattern of the as-synthesized zeolitic material (cf. diffractogram "a"), which exhibits well resolved peaks associated with the CHA-type zeolite structure. FIG. 2 shows the argon sorption isotherm of the calcined sample (cf. adsorption isotherm "a"), showing a typical Langmuir-type curve at a relative pressure of 10<$P/P_0$<0.01, which is due to the filling of micropores in the sample. At a relative pressure of 0.5-0.95, a hysteresis loop can be observed, suggesting the presence of mesoporosity and macroporosity. BET surface area and pore volume of the sample are 667 $m^2/g$ and 0.31 $cm^3/g$, respectively.

Figure 3:
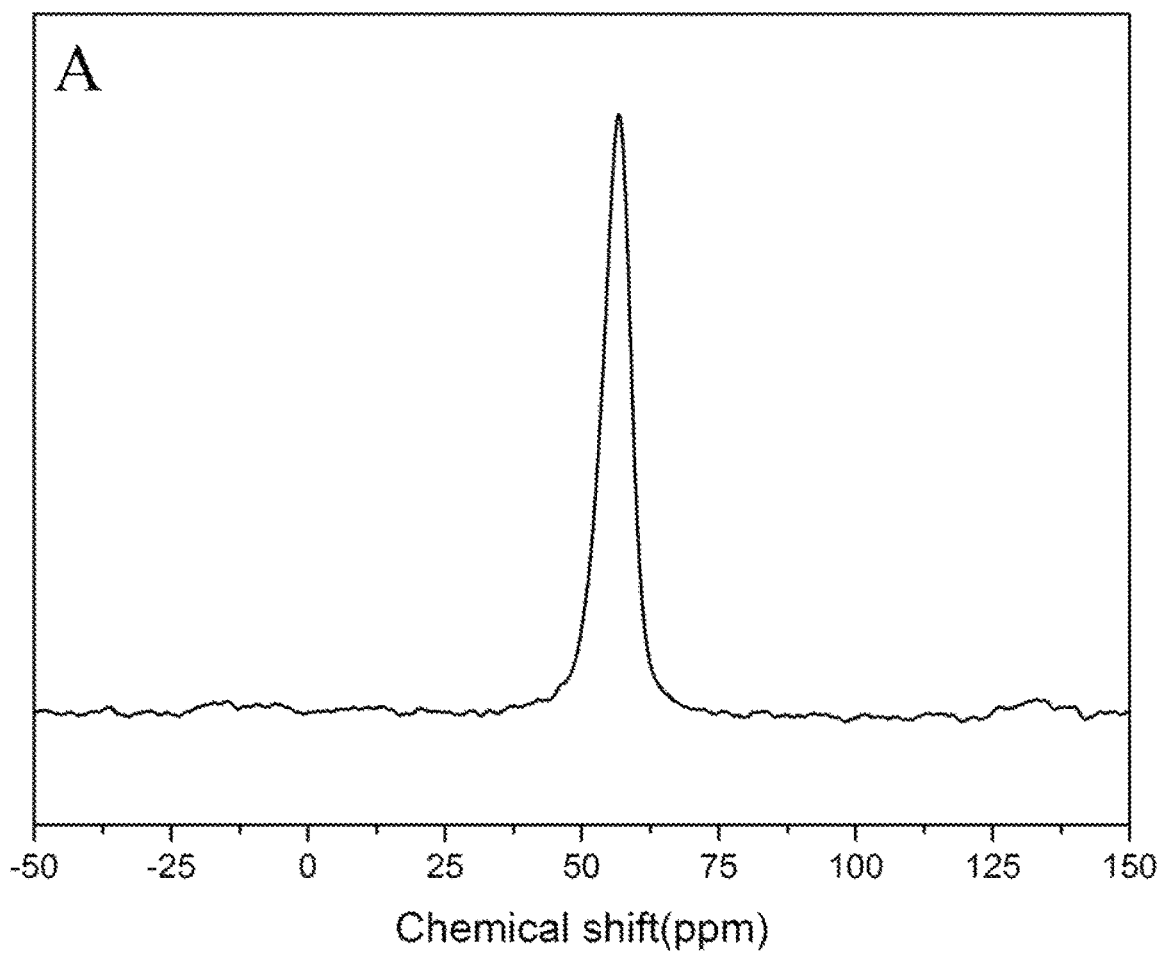
FIG. 3 shows the $^{27}Al$ MAS NMR spectrum of the as-synthesized zeolitic material obtained from Example 1. In the figure, the chemical shift in ppm is plotted along the abscissa and the relative intensity is plotted along the ordinate.

FIG. 3 shows the $^{27}Al$ MAS NMR spectrum of the as-synthesized zeolitic material, giving a sharp band at 56 ppm associated with tetrahedrally coordinated aluminum species in the framework. The absence of a signal around zero ppm indicates that there is no extra-framework $Al^{3+}$ species in the sample.

Figure 4:
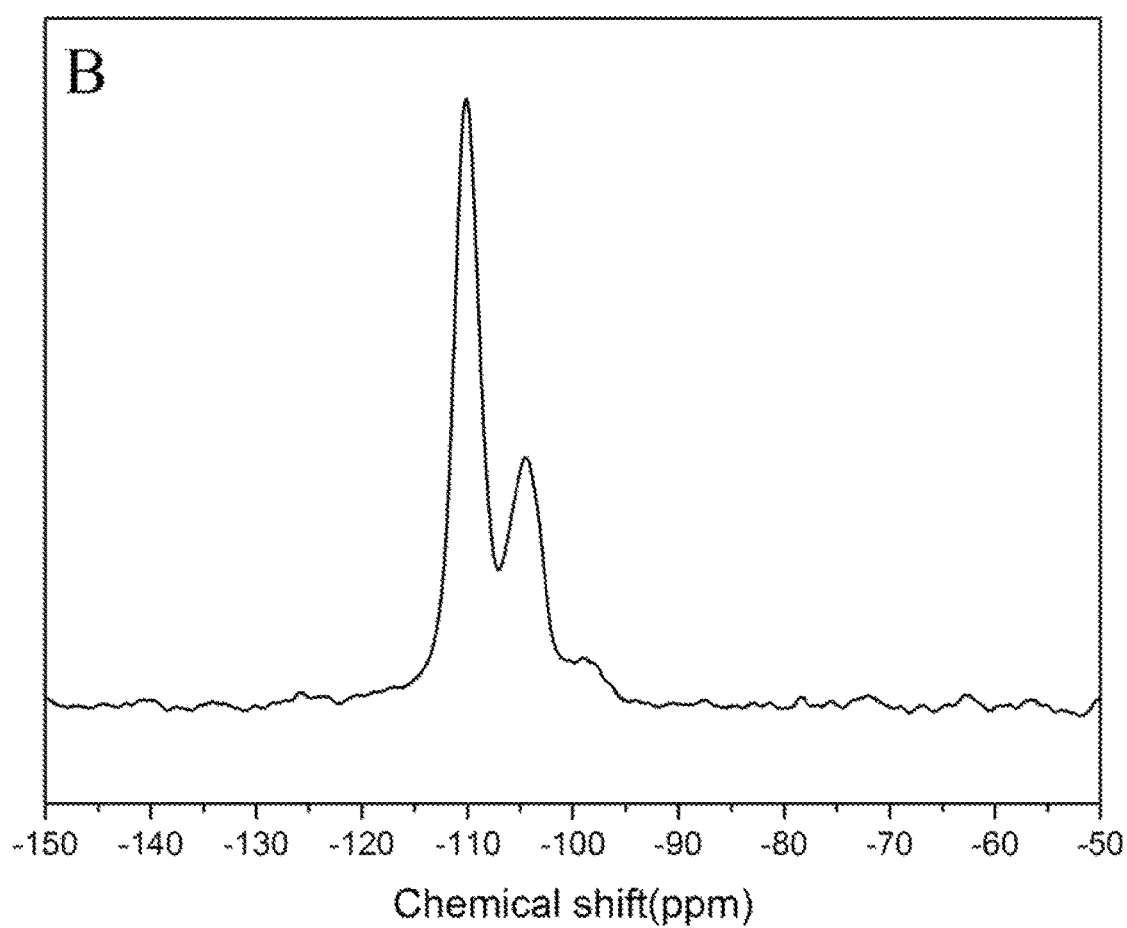
FIG. 4 shows the $^{29}Si$ MAS NMR spectrum of the as-synthesized zeolitic material from Example 1. In the figure, the chemical shift in ppm is plotted along the abscissa and the relative intensity is plotted along the ordinate.

FIG. 4 shows the 29Si MAS NMR spectrum of the as-synthesized zeolitic material, exhibiting peaks at about −110.7 and −104.9 ppm associated with Si(4Si) and Si(3Si), respectively.

Example 2: Preparation of a Zeolitic Material Having a CHA-Type Framework Structure (SSZ-13) at 180° C. Via Inzterzeolitic Transformation of Zeolite Y Example 1 was repeated, wherein the powder mixture was not heated at 150° C. but rather heated at 180° C. for 24 h FIG. 1 shows the XRD pattern of the as-synthesized zeolitic material (cf. diffractogram "b"), which exhibits well resolved peaks associated with CHA-type zeolite structure. FIG. 2 shows the argon sorption isotherms of these calcined sample (cf. adsorption isotherm "b"). At a relative pressure of 0.5-0.95, a hysteresis loop can be observed, suggesting the presence of mesoporosity and macroporosity in these samples. BET surface area and pore volume of the sample are 552 $m^2/g$ and 0.26 $cm^3/g$, respectively.

Example 3: Preparation of a Zeolitic Material Having a CHA-Type Framework Structure (SSZ-13) at 240° C. Via Inzterzeolitic Transformation of Zeolite Y 1 g of zeolite Y (Si/Al=10.8) containing $H_2O$ (0.625 g of Y and 0.375 g $H_2O$), 0.9 g of template (50 wt.-% aqueous solution of N,N,N-1-trimethyladamantammonium hydroxide), 0.08 g of NaOH and 0.037 g of uncalcined SSZ-13 zeolite seeds were mixed together for affording a reaction mixture which contained 142 wt.-% of $H_2O$ based on 100 wt.-% of $SiO_2$ contained in the zeolite Y of the mixture. After grinding for 5-7 min, the powder mixture was transferred to an autoclave and sealed. After heating at 240° C. for 1 hour, the sample was completely crystallized. The obtained sample was calcined at 550° C. for 5 hours to remove the template. The H-form of the sample was prepared by triple ion-exchange with 1 M $NH_4NO_3$ solution at 80° C. for 1 h and calcination at 550° C. for 5 h.

The reaction yield was 80%, and the resulting SSZ-13 displayed an Si to Al molar ratio of 8.6 as determined by ICP.

Figure 9:
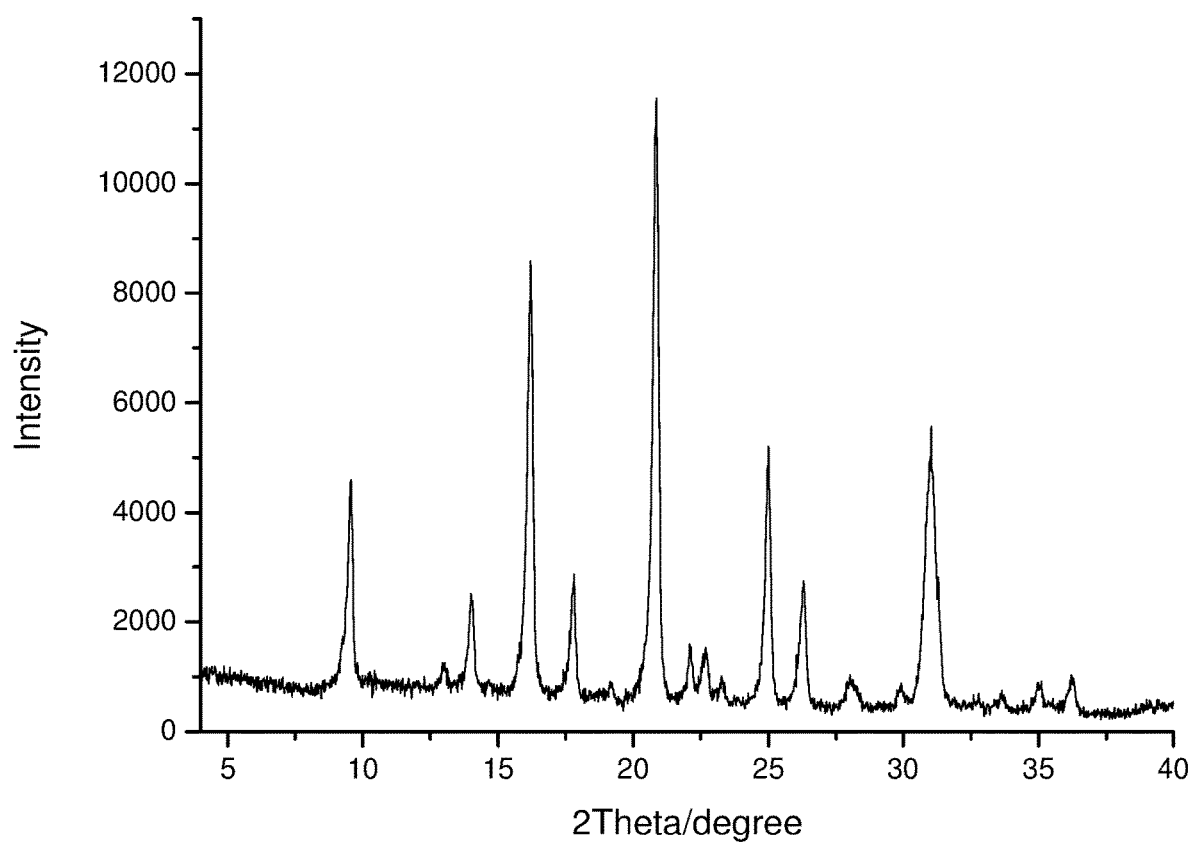
FIG. 9 shows the XRD pattern of the as-synthesized zeolitic material obtained according to Example 3. In the figure, the angle 2 theta in ° is shown along the abscissa and the intensities are separately plotted along the ordinate for each diffractogram.

FIG. 9 shows the XRD pattern of the as-synthesized zeolitic material, which exhibits well resolved peaks associated with the CHA-type zeolite structure.

Example 4: Preparation of a Zeolitic Material Having a AEI-Type Framework Structure (SSZ-39) Via Inzterzeolitic Transformation of Zeolite Y 1 g of zeolite Y (Si/Al=10.8) containing $H_2O$ (0.625 g of Y and 0.375 g $H_2O$), 0.7 g of template (40 wt.-% aqueous solution of N,N-dimethyl-2,6-dimethylpiperridinium hydroxide), 0.35 g of NaOH and 0.02 g of uncalcined SSZ-39 zeolite seeds were mixed together for affording a reaction mixture which contained 137 wt.-% of $H_2O$ based on 100 wt.-% of $SiO_2$ contained in the zeolite Y of the mixture. After grinding for 5-7 min, the powder mixture was transferred to an autoclave and sealed. After heating at 140° C. for 72 hours, the sample was completely crystallized. The obtained sample was calcined at 550° C. for 5 hours to remove the template. The H-form of the sample was prepared by triple ion-exchange with 1 M $NH_4NO_3$ solution at 80° C. for 1 h and calcination at 550° C. for 5 h.

The reaction yield was 32%, and the resulting SSZ-13 displayed an Si to Al molar ratio of 5.0 as determined by ICP.

Figure 5:
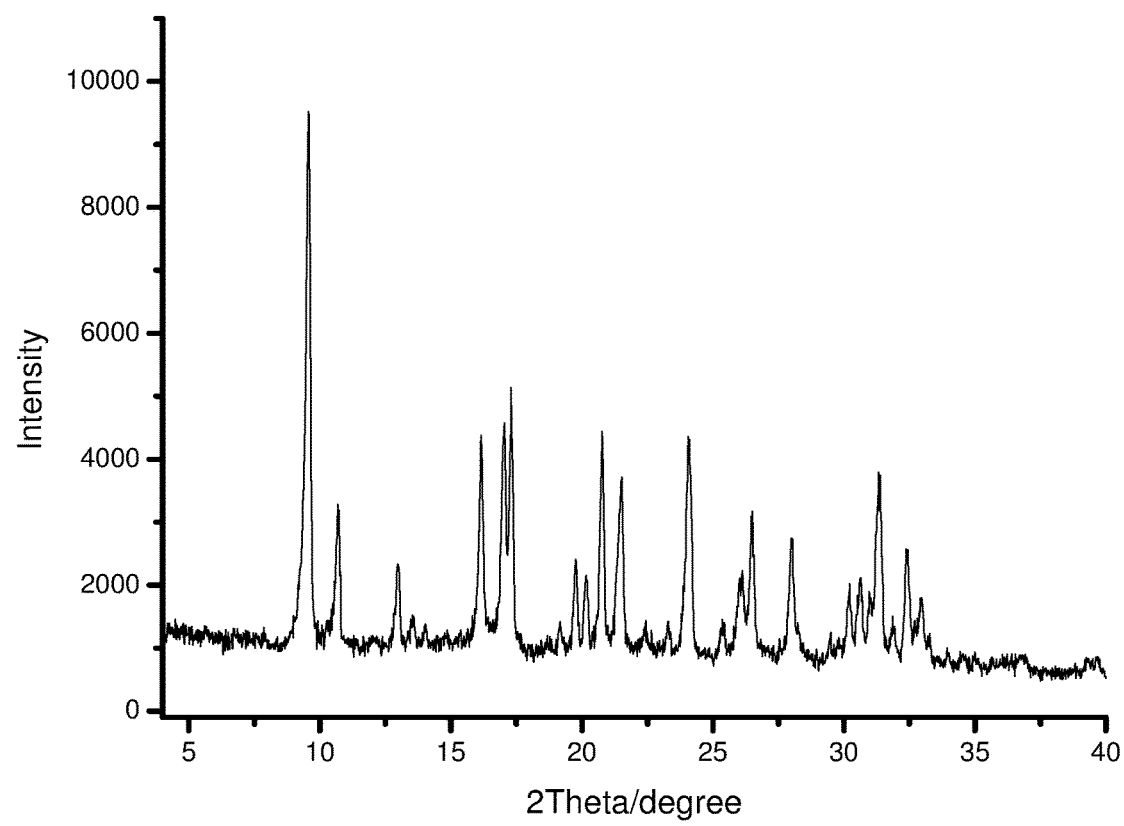
FIG. 5 shows the X-ray diffraction pattern of the zeolitic material obtained from Example 4. In the figure, the angle 2 theta in ° is shown along the abscissa and the intensities are separately plotted along the ordinate for each diffractogram.

FIG. 5 shows the X-ray diffraction pattern of the zeolitic material obtained, which displays an AEI-type framework structure.

Figure 6:
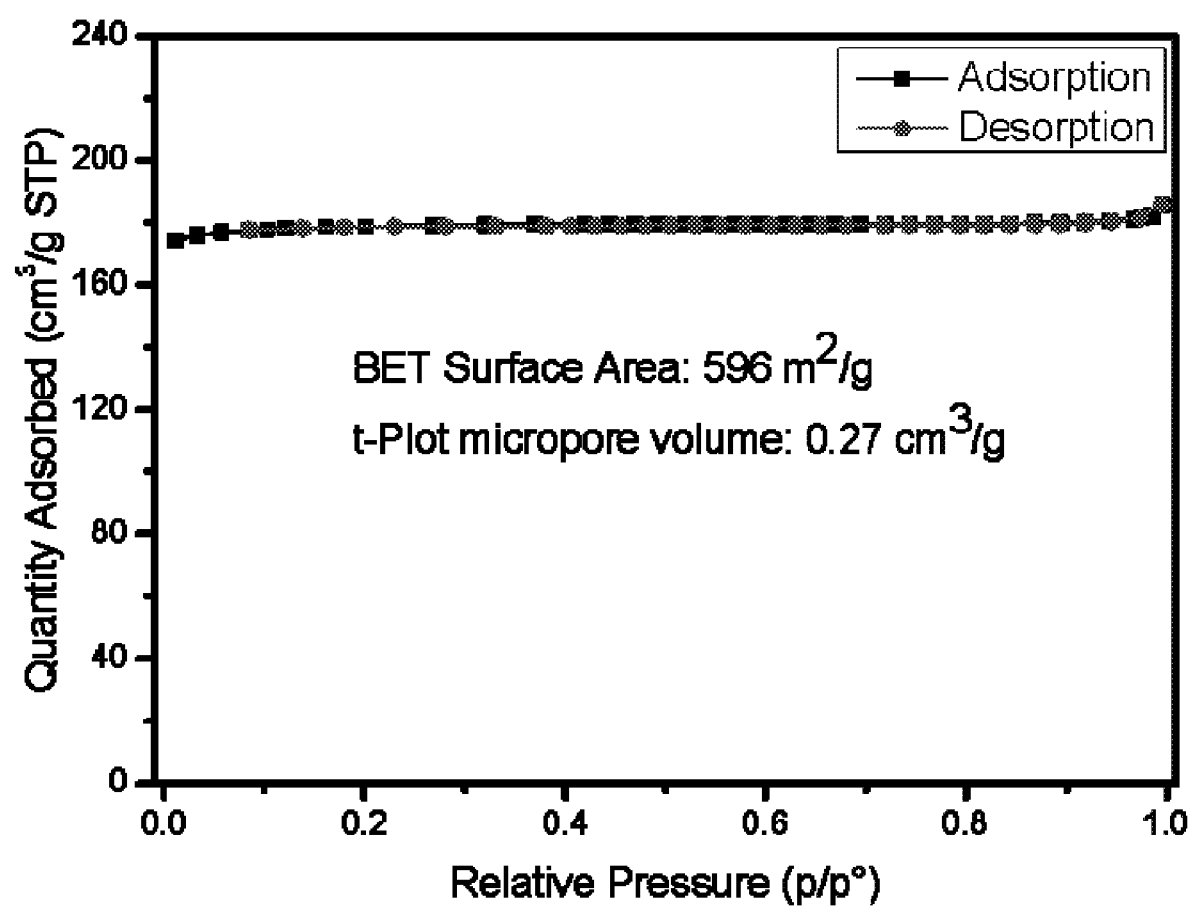
FIG. 6 displays the Ar sorption isotherm of the zeolitic material obtained from Example 4. In the figure, the relative pressure $P/P_0$ is plotted along the abscissa and the volume of argon (under standard temperature and pressure) adsorbed in $cm^3/g$.

FIG. 6 displays the argon sorption isotherm of the zeolitic material obtained, according to which the sample has a BET surface area of 596 $m^2/g$ and a pore volume of 0.27 $cm^3/g$, respectively.

Comparative Example 1: Preparation of a Zeolitic Material Having a CHA-Type Framework Structure Via Hydrothermal Synthesis 277 kg of a 20 wt.-% aqueous solution of cyclohexyltrimethylammonium hydroxide (CHTMAOH) and 78 kg of a 25 wt.-% aqueous solution of tetramethylammonium hydroxide (TMAOH) were placed in an autoclave after which 34.8 kg of aluminumtriisopropylate were added under stirring at 50 rpm, and further stirred at that rate until the aluminumtriisopropylate had entirely dissolved. 358 kg of a 40 wt.-% solution of colloidal silica (Ludox AS40) were then added, and the mixture stirred an additional 10 min. Finally, 5.7 kg of SSZ-13 zeolite were added to the mixture under stirring, wherein the pH of the resulting mixture was measured to be 14.24. The mixture was then crystallized at 170° C. for 18 h, wherein the mixture was first progressively heated to the reaction temperature using a constant temperature ramp over a period of 7 hours. A white suspension having a pH of 13.14 was obtained, which was filtered and the solid washed with distilled water until substantial electroneutrality of the washwater was achieved. The resulting solid was dried and subsequently calcined at 550° C. for 5 h under air for obtaining a powder having a crystallinity of 92% as determined by XRD and displaying an average crystal size of 107 nm.

Figure 7:
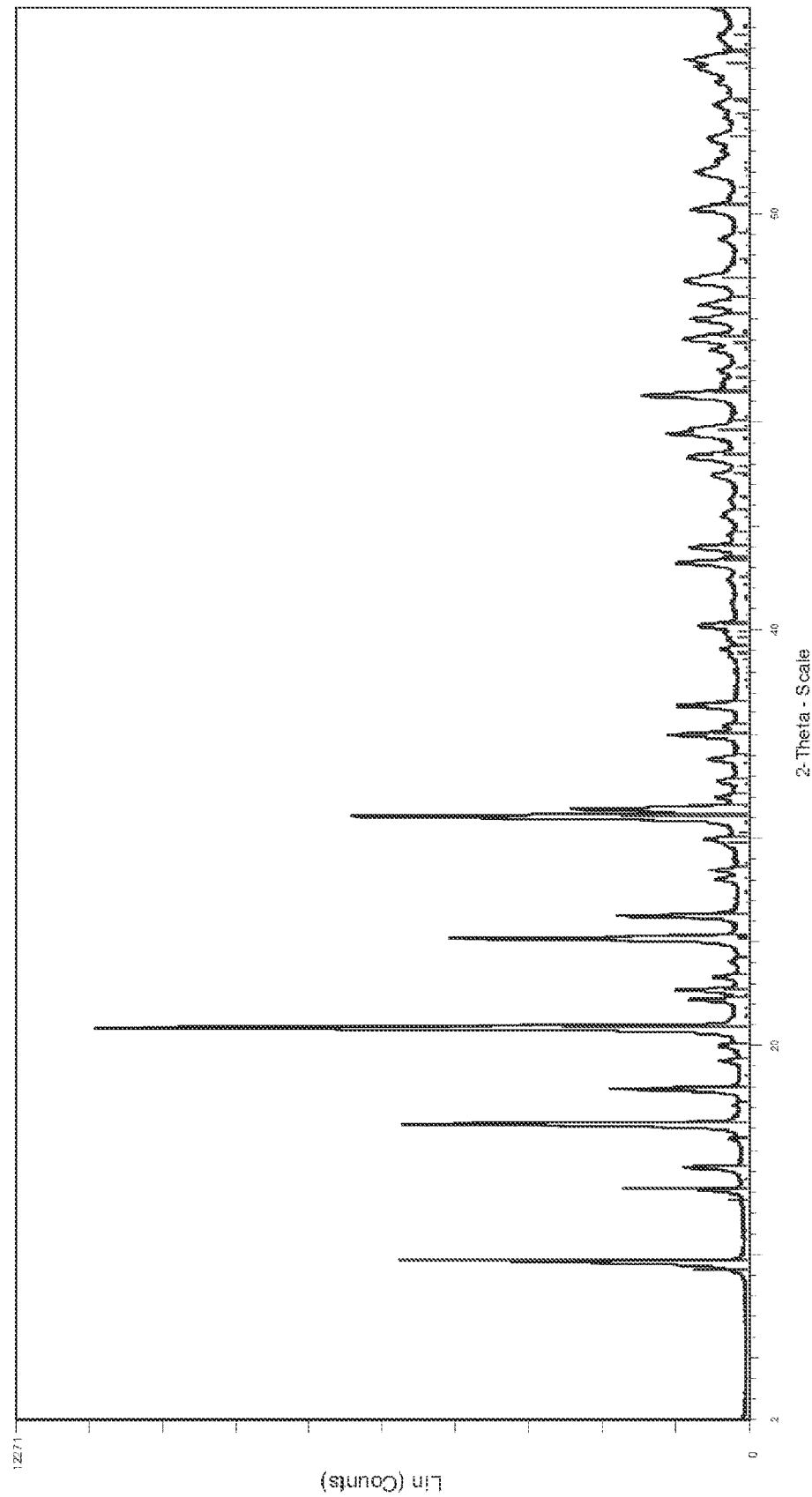
FIG. 7 displays the XRD of the as synthesized zeolitic material obtained according to Comparative Example 1 prior to ion exchange with copper. In the diffractogram, the line pattern of Chabazite is shown for comparative purposes. In the figure, the angle 2 theta in ° is shown along the abscissa and the intensities are separately plotted along the ordinate for each diffractogram.

As may be taken from XRD of the resulting material displayed in FIG. 7, the resulting zeolitic material has the CHA framework structure.

Elemental analysis of the product afforded:
Si: 34.0 wt.-%
Al: 2.6 wt.-%
Na: 0.12 wt.-%
C: 12.6 wt.-%
N: 1.7 wt.-%

1.3 kg of distilled water and 202.2 g of the calcined zeolitic material were placed in a 4 liter receptacle and heated to 60° C. and held at that temperature for 30 min. Subsequently, 20.13 g of copper(II) acetate and 2.22 g of 70% acetic acid were added and the mixture further heated at 60° C. for 1 h under constant stirring of the mixture at 200 rpm. Heating was then discontinued, and 975 g of distilled water were added to the mixture which was then filtered and washed with distilled water until the washwater displayed a conductivity of 138 µS. The filter cake was then dried over night at 120° C. affording 208 g of copper ion exchanged zeolitic material.

Elemental analysis of the copper ion-exchanged product afforded:
Si: 39.0 wt.-%
Al: 3.1 wt.-%
Cu: 2.2 wt.-%
Na: 0.02 wt.-%
C: 0.11 wt.-%

Example 5: Catalytic Testing Performed on Fresh Catalysts

The selective catalytic reduction activity measurements were carried out in a fixed-bed quartz reactor with the reactant gas mixture containing 500 ppm $NO_x$ 500 ppm $NH_3$, 10% $O_2$, and $N_2$ balance. The gas hourly space velocity (GHSV) was 80,000 $h^{-1}$. Copper ion-exchanged samples from Examples 1 and 2 and from Comparative Example 1 (benchmark) were prepared via ion-exchanged method with $Cu(NO_3)_2$ aqueous solution, and the copper loading of the samples was about 2 wt %.

Figure 8:
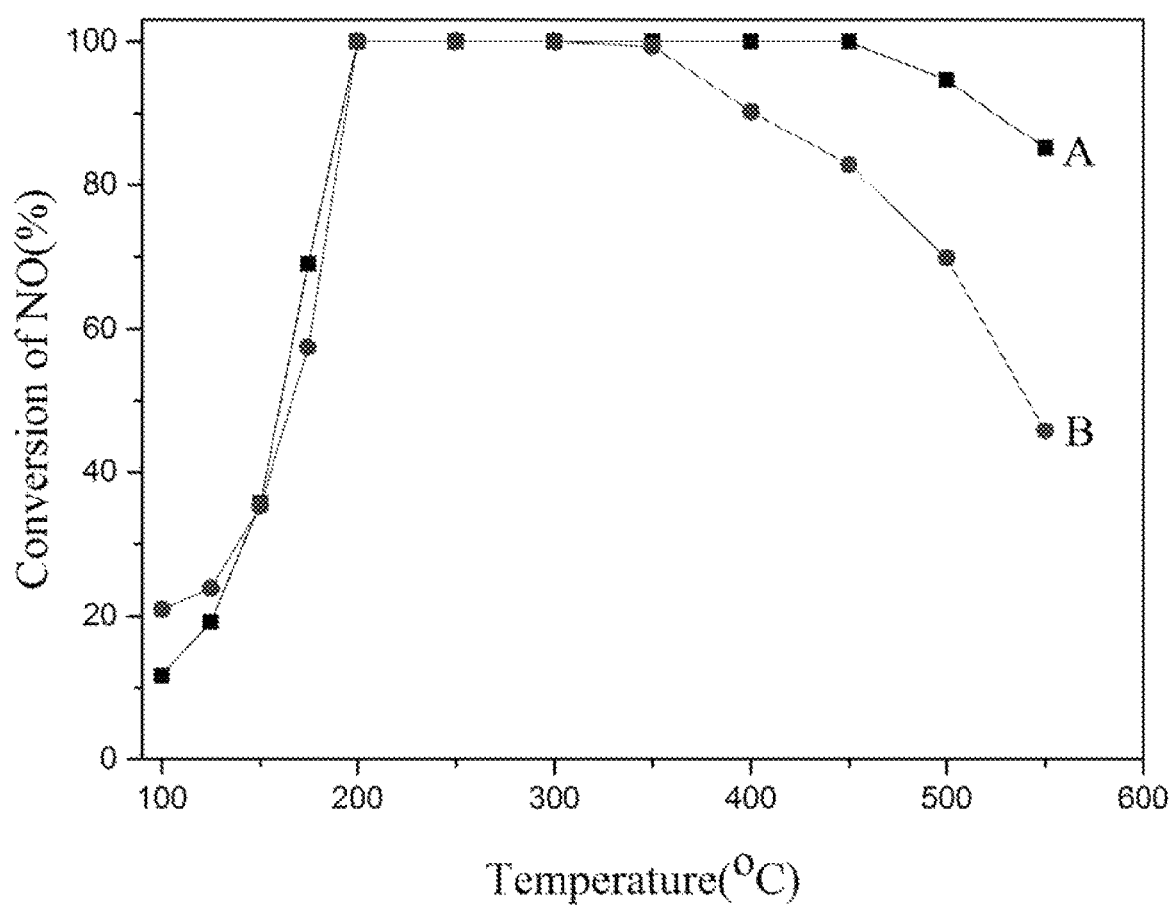
FIG. 8 displays the results from $NH_3$—SCR catalyst testing performed in Example 5 over the copper ion-exchanged zeolite of Example 1 designated with "■" and Example 2 designated as "●". In the figure, the temperature measured at the catalyst in ° C. is shown along the abscissa and the NO conversion rate in % is plotted along the ordinate.

After ion-exchanged with $Cu(NO_3)_2$ aqueous solution, the copper ion-exchanged samples from Examples 1 and 2 were tested in the selective catalytic reduction of $NO_x$ with $NH_3$ ($NH_3$—SCR), the results of which are shown in FIG. 8. Both samples show nearly 100% of NO conversion in the temperature range of 200-450° C. Surprisingly, however, the zeolitic material obtained according to Example 2 displays a considerably improved performance at higher temperatures, starting at 350° C., wherein the discrepancy continually increases with increasing temperature.

Example 6: Catalytic Testing Performed on Aged Catalysts

Copper ion-exchanged samples from Example 1 and Comparative Example 1 as obtained according to Example 4 were subject to separate aging procedures. In a first aging procedure, respective samples were subject to aging at 650° C. in air with a water content of 10 vol. % for 50 h (HDD aging), whereas in a further aging procedures, separate samples were respectively subject to aging at 800° C. in air with a water content of 10 vol. % for 16 h (LDD aging). The aged samples were then respectively tested with respect to their $NO_x$ conversion efficiency according to the testing procedure as described in Example 4, wherein the results of said testing are displayed in Table 1.

TABLE 1

$NO_x$ conversion rates measured for samples according to Example 1 and Comparative Example 1 depending on aging conditions and reaction temperature.

| Sample (aging conditions) | $NO_x$ conversion (%) at 200° C. | $NO_x$ conversion (%) at 575° C. |
| --- | --- | --- |
| Example 1 (650° C./50 h) | 64.2 | 98.1 |
| Comp. Ex. 1 (650° C./50 h) | 78.1 | 92.8 |
| Example 1 (800° C./16 h) | 69.2 | 96.4 |
| Comp. Ex. 1 (800° C./16 h) | 70.5 | 86.0 |

Thus, as may be taken from the results displayed in table 1, the performance of the inventive example subject to mild aging at 650° C. displays an inferior rate of $NO_x$ conversion at low temperatures yet clearly outperforms the catalyst according to comparative example 1 at 575° C., wherein $NO_x$ conversion achieved by the inventive catalyst is almost complete by attaining a value of 98.1%. Interestingly, however, after having been subject to severe aging at 800° C., the inventive catalyst displays an $NO_x$ conversion rate which matches the conversion rate achieved by the sample according to comparative example 1, whereas at high temperatures, the inventive catalyst outperforms the catalyst according to the comparative example to an even greater degree than after having been subject to mild their aging conditions.

Accordingly, it has surprisingly been found that the inventive zeolitic materials obtained according to the inventive process not only display a highly improved performance in $NO_x$ conversion at elevated temperatures compared to known catalyst, but furthermore are able to match the conversion rates of the known catalysts at lower temperatures after having been subject to more severe aging conditions. Therefore, the inventive catalysts display a clearly improved performance in $NO_x$ conversion activity compared to catalysts obtained according to the art at high temperatures, wherein even further improvement is observed relative to conventional catalysts upon increasing levels of aging.

LIST OF THE CITED PRIOR ART REFERENCES

M. Beale et al. in *Chem. Soc. Rev.*, 2015, 44, 7371-7405
J. H. Kwak et al. in *J. Catal.*, 2010, 275, 187-190
D. W. Fickel et al. in *J. Phys. Chem. C*, 2010, 114, 1633-1640
D. W. Fickel et al. in *Appl Catal., B*, 2011, 102, 441-448
U. Deka et al. in *J. Phys. Chem. C*, 2012, 116, 4809-4818
V. F. Kispersky et al. in *Phys. Chem. Chem. Phys.*, 2012, 14, 2229-2238
F. Gao et al. in *J. Catal.*, 2013, 300, 20-29
U.S. Pat. No. 4,544,538
U.S. Pat. No. 4,665,110
S. I. Zones in *J. Chem. Soc., Faraday Trans.*, 1990, 86, 3467
S. I. Zones in *J. Chem. Soc., Faraday Trans.*, 1991, 87, 3709
M.-J. Diaz-Cabaras et al. in *Chem. Commun.*, 1998, 17, 1881
S. I. Zones et al. in *Zeolites*, 1988, 8, 166
M. Itakura et al. in *Micropor. Mesopor. Mater.*, 2011, 144, 91-96
K. Honda et al. in *J. Nanosci. Nanotechnol.*, 2013, 13, 3020-3026
R. Nedyalkova et al. in *Top. Catal.*, 2013, 56, 550-557
T. Sano et al. in *J. Jpn Pet. Inst.* 2013, 56, 183-197
L. Van Tendeloo et al. in *Chem. Commun.*, 2013, 49, 11737-11739
M. Itakura et al. in *Micropor. Mesopor. Mater*, 2011, 144, 91-96
X. Meng et al. in *Chem. Rev.*, 2014, 114, 1521-1543
Xie et al. in *Chem. Mater.*, 2008, 20, 4533-4535
Xie et al. in *Chem. Commun.*, 2011, 47, 3945-3947
H. Zhang et al. in *Acta Chim. Sinica*, 2012, 70, 2387-2392
S. Goel et al. in *Chem. Mater.*, 2015, 27, 2056-2066
WO 2016/014702 A1
Sonoda et al. in *J. Mater. Chem. A*, 2015, 3, 857-865
L. Ren et al. in *J. Am. Chem. Soc.*, 2012, 134, 15173
Q. Wu et al. in *J. Am. Chem. Soc.*, 2014, 136, 4019
Q. Wu et al. in *J. Am. Chem. Soc.*, 2015, 137, 1052-1055
L. Zhu et al. in *J. Mater. Chem. A*, 2015, 3, 14093-14095
X. Meng et al. in *Sci. China Chem.*, 2015, 58, 6-13
X. Wang et al. in *Chem. Commun.* 2015, 51, 16920-16923
Y. Jin et al. in *Angew. Chem. Int. Ed.*, 2013, 52, 9172
Y. Jin et al. in *Chem. Euro. J.*, 2014, 20, 17616-17623

The invention claimed is:

1. A process for preparing a zeolitic material comprising $YO_2$ and $X_2O_3$ in its frame-work structure, wherein Y stands for a tetravalent element and X stands for a trivalent element, said process comprising:
  (1) preparing a mixture comprising one or more structure directing agents, seed crystals, and a first zeolitic material comprising $YO_2$ and $X_2O_3$ in its framework structure, wherein the first zeolitic material has at least one framework structure selected from the group consisting of FAU-, GIS-, MOR-, and LTA-type framework structures; and (2) heating the mixture obtained in (1) for obtaining a second zeolitic material comprising $YO_2$ and $X_2O_3$ in its framework structure, wherein the second zeolitic material obtained in (2) has a different type of framework structure than the first zeolitic material;

wherein the mixture prepared in (1) and heated in (2) contains 1 to 170 wt. % $H_2O$ based on 100 wt.-% of $YO_2$ in the framework structure of the first zeolitic material.

2. The process of claim 1, wherein the second zeolitic material obtained in (2) has a CHA-type framework structure.

3. The process of claim 1, wherein the one or more structure directing agents comprises one or more tetraalkylammonium cation $R^1R^2R^3R^4N^+$-containing compounds, wherein $R^1$, $R^2$, and $R^3$ independently from one another stand for alkyl, and wherein $R^4$ stands for cycloalkyl.

4. The process of claim 1, wherein the one or more structure directing agents comprises one or more tetraalkylammonium cation $R^1R^2R^3R^4N^+$-containing compounds, wherein $R^1$, $R^2$, and $R^3$ independently from one another stand for alkyl, and wherein $R^4$ stands for adamantyl and/or benzyl.

5. The process of claim 1, wherein the one or more structure directing agents comprises one or more tetraalkylammonium cation $R^1R^2R^3R^4N^+$-containing compounds, wherein $R^1$, $R^2$, $R^3$ and $R^4$ independently from one another stand for alkyl, and wherein $R^3$ and $R^4$ form a common alkyl chain.

6. The process of claim 1, wherein Y is selected from the group consisting of Si, Sn, Ti, Zr, Ge, and a mixture thereof.

7. The process of claim 1, wherein X is selected from the group consisting of Al, B, In, Ga, and a mixture thereof.

8. The process of claim 1, wherein the heating (2) is conducted at a temperature ranging from 170 to 300° C.

9. The process of claim 8, wherein the heating (2) is conducted for a period in the range of from 0.1 h to 6 h.

10. The process of claim 1, further comprising
(3) calcining the second zeolitic material obtained in (2).

11. The process of claim 10, further comprising
(4) subjecting the zeolitic material obtained in (2) or (3) to an ion-exchange procedure.

12. The process of claim 11, further comprising
(5) calcining the zeolitic material obtained in (4).

13. The process of claim 1, wherein the seed crystals comprise a zeolitic material having a CHA-type and/or an AEI-type framework structure.

14. A zeolitic material, obtained according to the process of claim 1.

15. A molecular sieve, an adsorbent, a catalyst, and/or a catalyst support, comprising the zeolitic material of claim 14.

* * * * *